United States Patent [19]

Wand et al.

[11] Patent Number: 5,626,792
[45] Date of Patent: May 6, 1997

[54] HIGH BIREFRINGENCE LIQUID CRYSTAL COMPOUNDS

[75] Inventors: Michael Wand, Boulder; William N. Thurmes, Longmont; Kundalika Moré, Denver; Rohini T. Vohra, Boulder, all of Colo.

[73] Assignee: Displaytech, Inc., Longmont, Colo.

[21] Appl. No.: 301,121

[22] Filed: Sep. 6, 1994

[51] Int. Cl.$^6$ .................. C09K 19/52; C09K 19/34; C09K 19/06; C09K 19/32
[52] U.S. Cl. .................. 252/299.01; 252/299.6; 252/299.61; 252/299.62; 252/299.66; 544/298
[58] Field of Search .................. 252/299.01, 299.6, 252/299.61, 299.66, 299.62; 544/298

[56] References Cited

U.S. PATENT DOCUMENTS

| | | | |
|---|---|---|---|
| 4,877,549 | 10/1989 | Sawada et al. | 252/299.63 |
| 4,961,874 | 10/1990 | Takeuchi et al. | 252/299.6 |
| 5,047,169 | 9/1991 | Shibata et al. | 252/299.6 |
| 5,068,053 | 11/1991 | Reiffenrath et al. | 252/299.61 |
| 5,154,851 | 10/1992 | Goto et al. | 252/299.63 |
| 5,164,114 | 11/1992 | Kurmeier et al. | 252/299.61 |
| 5,178,790 | 1/1993 | Weber et al. | 252/299.01 |
| 5,178,791 | 1/1993 | Wand et al. | 252/299.6 |
| 5,202,471 | 4/1993 | Chandraratna | 562/473 |
| 5,349,105 | 9/1994 | Chandraratna | 564/163 |
| 5,457,235 | 10/1995 | Wand et al. | 568/65 |

FOREIGN PATENT DOCUMENTS

| | | |
|---|---|---|
| 3901266 | 1/1989 | Germany. |
| 63-284147 | 11/1988 | Japan. |
| 1-221352 | 9/1989 | Japan. |
| 1-245089 | 9/1989 | Japan. |
| 2-88541 | 3/1990 | Japan. |
| WO8705018 | 8/1987 | WIPO. |

OTHER PUBLICATIONS

M. Hird and K. J. Toyne (1993) "Palladium-Catalyzed Cross-Coupling Reactions in the Synthesis of Some High Polarizability Materials", *Liquid Cryst.* 14(3):741–761.

V. Reiffenrath et al. (1989) "New Liquid Crystalline Compounds with Negative Dielectric Anisotropy", *Liquid Cryst.* 5:159–170.

H. Shindo et al. (1990) "Surface Structures of a Ferroelectric Liquid Crystal on Graphite Observed by Scanning Tunnelling Microscopy", *J. Chem. Soc. Chem. Commun.* pp. 760–762.

K. Seto et al. (1990) "Chiral Tolans: A New Family o Ferroelectric Liquid Crystals", *Mol. Cryst. Liq. Cryst. Letters.* 7(1):1–5.

*Primary Examiner*—C. H. Kelly
*Attorney, Agent, or Firm*—Greenlee, Winner and Sullivan, P.C.

[57] ABSTRACT

High birefringence liquid crystal dopants having the formula:

$$R_1X-C-\!\!=\!\!-D-T$$

wherein C and D, independently of one another, are aromatic ring systems each of which has one or two 5-member or 6-member carbon rings wherein one or two carbons of any ring in C or D can be substituted with a nitrogen, oxygen or sulfur atom and wherein any ring in C or D can be substituted with one or two halogen atoms; T is a halogen, haloalkyl, haloalkoxy, vinylhalide or a group $YR_2$ where Y is a single bond, double bond, triple bond, —COS—, —$CS_2$—, —CH=CH—CO—S—, —CH=CH—CS—S— or —CH=CH—CO—O— group; X is a single bond, double bond, triple bond, O or S atoms or a cyclohexane or cyclohexene group, Z—Q—W, where Q is a cyclohexane or cyclohexene ring in which one or two of the ring carbons can be replaced with an O atom or in which one or more of the ring carbons can be substituted with a halogen atom or a cyano group, Z is a single bond or an O or S atom and W is a single bond, a —$CH_2$— group, a —CH2—$CH_2$— group, or a —$CH_2$—O— group; and $R_l$ and $R_2$ are, independently of one another, alkyl groups having from about 3 to about 20 carbon atoms in which one or more —$CH_2$— groups can be halogenated, two neighboring —$CH_2$— groups can be substituted with an epoxide, or one or more non-neighboring —$CH_2$— groups can be substituted with a double bond, triple bond, an O atom, a S atom, or a silyl group $SiR_AR_B$ wherein $R_A$ and $R_B$, independently of one another, can be alkyl or alkenyl groups having 1 to about 6 carbon atoms are provided. More specifically, high birefringence dopants that are alkynyl tolanes dialkynyl tolanes and tolanes having cinnamate ester tails and derivatives of those tails are provided. High birefringence dopants also possess UV stability, IR clarity and other properties that affect LC properties.

28 Claims, No Drawings

HIGH BIREFRINGENCE LIQUID CRYSTAL COMPOUNDS

This invention was made with at least partial support of the United States Government through a grant from the United States Army. The United States Government has certain rights in this invention.

FIELD OF THE INVENTION

This invention relates to tolane compounds useful as components in liquid crystal compositions for display application. The tolane compounds are particularly useful as components of super twist nematic liquid crystals for display applications.

BACKGROUND OF THE INVENTION

Liquid crystals have found use in a variety of electrooptical and display device applications, in particular those which require compact, energy-efficient, voltage-controlled light valves such as watch and calculator displays. Liquid crystal displays have a number of unique characteristics, including low voltage and low power of operation, which make them perhaps the most promising candidate materials for non-emissive electrooptical displays available with current technology. Most of these devices are based upon the dielectric alignment effects in nematic, cholesteric and smectic phases of the liquid crystal compound in which, by virtue of dielectric anisotropy, the average molecular long axis of the liquid crystal molecules take up a preferred orientation in an applied electric field. Since the coupling to the applied electric field by this mechanism is rather weak, the resultant electrooptical response may be too slow for many potential applications. The requirement for speed may become especially important in proportion to the number of elements which have to be addressed in a device. This may result in increasingly impractical production costs for the potential use of such devices in flat-panel displays for use in video terminals, oscilloscopes, radar and television screens.

Twisted nematic (TN) liquid crystals are currently widely employed for display applications. TN devices and related super twist nematic (STN) devices require nematic liquid crystal compositions with positive dielectric anisotropy. Nematic LC device applications require chemically stable LC compounds or mixtures of compounds which display a nematic phase over a substantial temperature range, preferably about room temperature. Oftentimes, desired electrooptic properties can be achieved in a nematic liquid crystal by addition of dopants to nematic host materials. The kind and amount of such dopants added allows the tuning of electrooptic properties in the resultant mixtures. LC dopants which enhance or introduce desired electrooptic properties in LC mixtures without detriment to mesomorphic properties are important for the production of LC compositions for device applications. Nematic LC compositions having high birefringence are important for certain high contrast display applications. LC dopants which enhance birefringence in LC mixtures without detriment to mesomorphic properties are important for such high contrast applications.

Passive matrix STN liquid crystal displays are widely used in flat panel applications. Scheffer, T.J. and Nehring, J. (1984) Appl. Phys. Lett. 45:1021. STN response times are sufficiently fast to follow cursor movement but remain too slow for video applications. The standard multiplexed addressing method used to drive these displays appears to limit speed. Using a recently developed drive method called active addressing, bright, high contrast, full color, full motion video images have been demonstrated on STN displays. Scheffer, T.J. and Clifton, B. (1992) SID 92:228–231; Conner, A.R. and Scheffer, T.J. (1992) Japan Display 92:69; Clifton, B. et al. (1992) Japan Display 92:503. Active addressing STN (ASTN) was demonstrated only at elevated temperatures, which although useful in projection displays is not useful for other display applications including those for lap-top computers. To produce full motion video images with active addressing, an inherent STN response of 50 ms or faster is needed. STN cell response is inversely related to the square of the cell thickness, thicker cells having slower response times. Reductions of about 15% in cell thickness are required with the best available STN's to achieve the response time needed for video applications at ambient temperatures. However, contrast generally decreases as cell thickness decreases. To preserve contrast while reducing cell thickness for speed enhancement, the birefringence of the STN liquid crystal must be increased. Furthermore, increased birefringence must be obtained without significant increase in viscosity of the liquid crystal.

LC dopants can be employed to achieve desirable properties in STN liquid crystal compositions. Dopants useful in STN compositions for ASTN applications must be compatible with and soluble in STN compositions. STN-compatible dopants minimize suppression of the I to N transition without adversely affecting the freezing point of the mixture. Preferred dopants remain soluble in host mixtures at relatively high concentrations, i.e. mixtures remain homogenous, over the temperature range of intended operation of the display. Dopants can be used to increase birefringence or dielectric anisotropy of mixtures. High birefringence materials often are unstable to UV light decomposing relatively rapidly on exposure. While UV filters can be employed in display to minimize exposure, preferred dopants are more stable to UV light. Other properties of STN mixtures that can be affected by dopants, including splay and bend elastic constants, as are understood in the art, may influence use of mixtures for ASTN applications. STN compositions having response times of about 50 ms or faster, birefringence ($\Delta n$) of about 0.24 or more, positive dielectric anisotropy of about 10 or more and low viscosity, most preferably 22 mm$^2$/sec or less, are preferred for ASTN applications.

Electrooptic effects with sub-microsecond switching speeds can be achieved using the technology of ferroelectric liquid crystals (FLCs) of N.A. Clark and S.T. Lagerwall (1980) Appl. Phys. Lett. 36:899 and U.S. Pat. No. 4,367,924. These investigators have reported display structures prepared using FLC materials having not only high speed response (about 1,000 times faster than currently used twisted nematic devices), but which also exhibit bistable, threshold sensitive switching. Such properties make FLC-based devices excellent candidates for light modulation devices including matrix-addressed light valves containing a large number of elements for passive displays of graphic and pictorial information, optical processing applications, as well as for high information content dichroic displays. A review of the applications of FLC devices is given by S.T. Lagerwall and N.A. Clark (1989) Ferroelectrics 94:3–62.

Tilted smectic liquid crystal phases, in particular smectic C phases, are useful in the preparation of FLC materials. Materials exhibiting such smectic phases which comprise chiral, nonracemic components possess a spontaneous ferroelectric polarization, or macroscopic dipole moment, deriving from a dissymmetry in the orientation of molecular dipoles in the liquid crystal phases (Myer et al. (1975) J.

Phys. (Les Ulis, Fr) 36:L-69). The ferroelectric polarization density is an intrinsic property of the material making up the phase and has a magnitude and sign for a given material under a given set of conditions. In FLC devices appropriate application of an external electric field results in alignment of the molecules in the FLC phase with the applied field. When the sign of the applied field is reversed, realignment or switching of the FLC molecules occurs. This switching can be employed for light modulation. Within a wide range of electric field strengths, the switching speed (optical rise time) is inversely proportional to applied field strength and polarization or dipole density (E) and directly proportional to orientational viscosity. Faster switching speeds are thus associated with FLC phases which possess higher polarization density and lower orientational viscosity.

A basic requirement for application of ferroelectric liquid crystals in SSFLC devices is the availability of chemically stable LC compounds or mixtures which exhibit chiral tilted smectic phases, preferably chiral smectic C phases, over a substantial temperature range, preferably about room temperature. Some FLC-like devices require LC materials having a smectic A phase. In some cases, a chiral nonracemic LC material will possess an enantiotropic or monotropic chiral tilted smectic phase. FLC mixtures possessing chiral smectic phases, including those with smectic C* phases (i.e., chiral smectic C) with useful temperature ranges, can also be obtained by admixture of chiral, nonracemic compounds, designated FLC dopants, into liquid crystal host material which exhibits a desired tilted smectic phase (an FLC host material) and which may or may not be composed of chiral molecules. Addition of the FLC dopant can affect the ferroelectric polarization density and/or the viscosity of the resultant FLC mixture and thereby affect switching speed. Desirable FLC dopants are molecules which impart high ferroelectric polarization density to an FLC mixture without significantly increasing the orientational viscosity of the mixture. Components of FLC mixtures can also be adjusted to vary phase transition temperatures or ranges.

Other properties of the FLC material, for example the tilt angle of the chiral smectic phase and the birefringence of the material, can affect their usefulness for particular device applications. These properties are affected by the structures of the various components and the amounts of these components in the FLC material. Most effort in the development of FLC materials has been directed toward flat panel display applications. The optimal characteristics for FLC materials used in such displays include high spontaneous polarization (Ps) and low orientational viscosity to achieve fast switching, tilt angles of 22.5° which result in maximum contrast in SSFLC cells switched between crossed polarizers, low birefringence which facilitates construction of a desirable thickness panel and broad temperature range (about room temperature). FLC materials useful in waveguides, integrated optics and spatial light modulators have somewhat different requirements. High polarization and low viscosity are desired for both display and optical switching FLC applications. Enhanced performance in optical switching FLC applications is correlated with high total refractive index changes between the switched states which is associated with high birefringence and large tilt angles. A particular type of FLC display device, a dichroic display device containing color switching elements incorporating mixtures of FLCs with dichroic dyes, also requires high tilt FLC material to achieve highest contrast. (See Ozaki et al. (1985) Jpn. J. Appl. Phys. Part I 24 (Suppl. 24–3):63–65.) For applications requiring high tilt angle and/or high birefringence it is desirable to have FLC materials which combine these properties with fast switching speed and broad room temperature smectic C* phases.

Dopants can also be employed to affect C* and N* pitch in FLC applications. Long N* pitch is associated with good alignment of FLC layers and higher contrast devices. Short C* pitch is required for Distorted Helix FLC applications. Chiral nonracemic dopants having N* pitch opposite in sign to polarization are useful as pitch compensating agents in FLC compositions. Chiral nonracemic dopants having N* pitch and C* pitch opposite in sign are useful in preparation of DHFLC mixtures having long N* pitch, preferred for alignment and high contrast.

Thermotropic liquid crystals molecules typically possess structures which combine a relatively rigid core coupled with two relatively "floppy", i.e., structurally flexible, tails. These tails are typically coupled to the core such that the LC molecule can assume a configuration with a relatively linear arrangement of the tails along the long axis of the core. Dopants useful for imparting desired properties to LC phases typically possess such a rigid core with at least one such flexible tail.

This invention provides LC compositions and LC dopants comprising a tolane core which are useful in FLC and STN applications.

U.S. Pat. No. 5,154,851 of Goto et al. relates to alkynyl tolane liquid crystal compounds having two or three-ring cores of the formula:

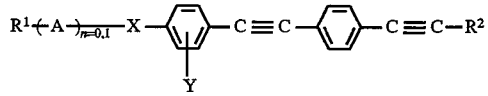

wherein when n=1 (three-ring cores) A is 1,4-phenylene, 1,4-phenylene substituted with one or two F, Cl, Br or CN, 1,4-cyclohexylene, pyrimidine-2,5-diyl or 1,3-dioxane-2,5-diyl, X is —COO—, —OCO—, —CH$_2$—CH$_2$—, —OCH$_2$—, —CH$_2$=CH$_2$—, or a single bond and R$^1$ and R$^2$ are 1–8C alkyl where one CH$_2$ group or two non-adjacent groups may be replaced by an O, —CO—, —COO —, —OCO— or —CH$_2$=CH$_2$ and when n=0 (two-ring cores) X is a single bond with Y=H or F. These compounds are said to raise birefringence without lowering NI point and without raising viscosity.

U.S. Pat. No. 5,047,169 of Shibata et al. relates to alkynyl or alkadienyl tolanes having the formula:

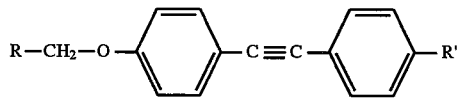

where R is an alkynyl or alkadienyl group having 3 to 18 carbon atoms and R' is an alkyl or alkoxy group having 1–18 carbon atoms. These compounds are said to elevate the anisotropy of a liquid crystal composition.

Hird and Toyne (1993) Liq. Crystals 14:741–761 relates to LC materials having high optical anisotropy. Among the compounds specifically disclosed are certain alkynyl substituted 1,4-phenyl-2,5-pyridinyl ethynes and certain alkynyl substituted 1,4-phenyl-2,5-pyrimidinyl ethynes.

A number of references refer to certain LC compounds or components having tolane or substituted tolane cores, including: Gray et al. (1989) WO 89/02425 (certain monofluorinated tolanes); German laid-open application DE 3901266 and Reiffenrath et al. (1989) Liq. Cryst. 5(1):159–170 (certain difluorinated tolanes); JP 1221352 (FLC compositions comprising certain tolanes).

Higuchi et al. U.S. Pat. No. 4,728,458 refers to chiral polyphenyl compounds useful in liquid crystal materials. The general formula (1) in the reference refers to halogenation of the core moiety which core appears to include tolanes. However, no tolanes appear to be specifically disclosed in the patent. Eidenschink et al. WO 87/05018 refers to optically active compounds and the general formula I in the reference appears to refer to halogenated tolane cores.

SUMMARY OF THE INVENTION

This invention provides high birefringence LC dopants useful as components of LC compositions for electrooptical device applications, including display applications. The subject compounds include tolanes, alkynyl tolanes and dialkynyl tolanes. This invention also includes LC compositions comprising one or more of the subject dopants.

The subject compounds include dopants which impart high birefringence to LC compositions, particularly to STN compositions, without substantial increase in viscosity. Subject compounds are also useful as dopants in FLC compositions to impart high birefringence without substantial detriment to response times. The subject compounds also include chiral nonracemic FLC dopants. Subject compounds further include those that are stable to UV irradiation and/or transparent to infrared radiation. Of particular utility in LC compositions are those dopants which impart high birefringence which are also stable to UV irradiation.

In specific embodiments, the subject compounds include high birefringence dopants for STN compositions which impart properties to the compositions needed or desired for ASTN applications. In addition to high birefringence subject compounds can impart or increase positive dielectric anisotropy in a composition. STN dopants include dopants that are stable to UV irradiation and dopants with increased solubility in and compatibility with STN host compositions. This invention includes STN compositions comprising one or more of the subject compounds which are useful in ASTN applications, particularly ASTN applications at room temperature. More preferred STN compositions of this invention comprise one or more of the subject dopants and exhibit a response time of about 50 msec or less. More preferred STN compositions comprising one or more of the subject dopants exhibit birefringence of about 0.24 or more and viscosity of 22 mm²/sec or less. More preferred STN compositions have positive dielectric anisotropy of about 10 or more.

Subject dopants are compounds of formula I:

$$R_1X—C—\equiv—D—T \qquad I$$

where C and D, independently of one another, are aromatic ring systems each of which has one or two 5- or 6-member rings wherein one or two carbons of each of the 5- or 6-member rings can be substituted with a nitrogen, oxygen or sulfur atom and each of the 5- or 6-member rings can be substituted with one or two halogen atoms; T is a halogen, haloalkyl, haloalkoxy or vinylhalide or $YR_2$ where Y is a —CH=CH—, —CO—S, —CS$_2$—, —CH=CH—CO—S—, —CH=CH—CO—O—, —C≡C— group or a single bond; X is a —CH=CH—, —C≡C—, O or S atom or a single bond or a cyclohexyl or cyclohexenyl containing-group Z—Q—W, where Q is a cylohexane or cylohexene in which one or two of the ring carbons of Q can optionally be replaced with an O atom or in which one or more of the ring carbons can be substituted with a halogen or a cyano group; Z is a single bond, an oxygen atom or a sulfur atom and W is a single bond, a —CH$_2$— group, a —CH$_2$—CH$_2$— group or a —CH$_2$O—group; $R_1$ and $R_2$ are, independently of one another, selected from alkyl groups having about 3 to about 20 carbon atoms in which one or more CH$_2$ groups can be halogenated, two neighboring CH$_2$ groups can be substituted with an epoxide, or one or more non-neighboring groups can be substituted with —CH=CH—, —C≡C—, an O atom, an S atom, or a silyl group, $SiR_AR_b$, wherein $R_A$ and $R_B$, independently of one another, can be alkyl or alkenyl groups having 1 to about 6 carbon atoms.

To minimize viscosity, preferred compounds of formula I have a total of 2 or 3 rings in the —C—≡—D— core. To maximize desirable LC properties, e.g. minimize detriment to desired LC phases on addition of dopants to hosts, tails $R_1X$— and T— are bonded at opposite sides of the core and preferably such that the bonds to the tails are at 180° with respect to each other. The dopants of formula I preferably have a substantially linear geometry.

Subject dopants include compounds of formula II:

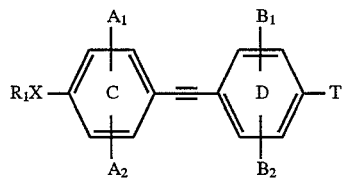

where $A_1$, $A_2$, $B_1$, and $B_2$ are independently selected from the group of a halogen and a hydrogen; and aromatic rings C and D are independently selected from the group of a 1,4-phenylene and a 1,4-phenylene in which one or two of the ring carbons are replaced with nitrogen and where T, X, Y, $R_1$, and $R_2$ are as defined for formula L; and of formula III:

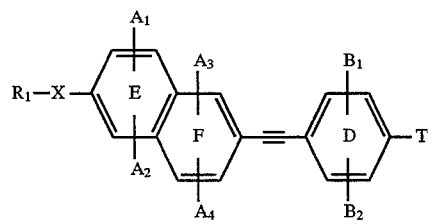

and formula IV:

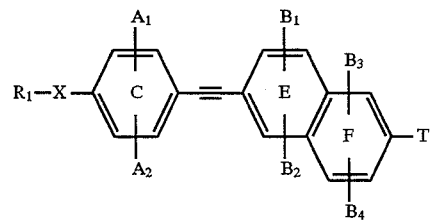

where $A_1$, $A_2$, $A_3$, $A_4$, $B_1$, $B_2$, $B_3$, and $B_4$ are independently selected from the group of a halogen and a hydrogen; aromatic rings C and D are independently selected from the group of a 1,4-phenylene and a 1,4-phenylene in which one or two of the ring carbons are replaced with a nitrogen; aromatic rings E and F, taken together, form an aromatic system selected from the group of a 2,6-naphthalene group and a 2,6-naphthalene group substituted with one or two nitrogen atoms in a ring of the naphthalene group; and where T, X, Y, $R_1$, and $R_2$ are as defined for formula I.

T of formulas I-IV can be selected from the group of halogens, or haloalkyl, haloalkoxy and vinyl halide groups having from one to about three carbon atoms. T can specifically be selected from trihalomethyl, dihalomethyl, trihalomethoxy, dihalomethoxy or dihaloethylene (CH=CZ$_2$), where Z is a halogen. Preferred halogens for T groups are Cl and F, with F most preferred.

Compounds of formula I in which T is a —CH$_2$=CH$_2$—CO—OR$_2$, e.g. a cinnamate ester group combine high birefringence and excellent UV stability.

In a specific embodiment, this invention provides LC dopants of formula V:

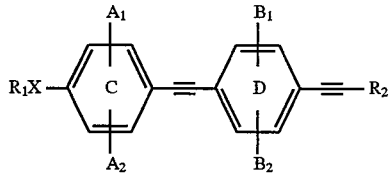

where R$_1$, R$_2$, A$_1$, A$_2$, B$_1$, B$_2$, and rings C and D are as defined for formula II, except that when only ring C is a nitrogen-containing 1,4-phenylene, at least one of B$_1$ or B$_2$ must be a halogen and when only ring D is a nitrogen-containing 1,4-phenylene, at least one of A$_1$ or A$_2$ must be a halogen.

In other specific embodiments, this invention provides LC dopants, including FLC dopants of formulas VI, VII and VIII:

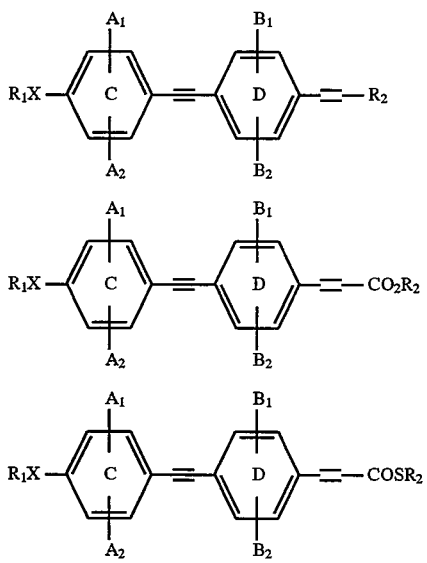

where R$_1$, X, A$_1$, A$_2$, B$_1$, B$_2$, R$_2$ and rings C and D are as defined for formula II. Preferred R$_2$ are alkyl and alkenyl groups having from 1 to about 18 carbon atoms. Specifically provided are compounds of formulas VI, VII and VIII where X is a single bond or an O atom. Other related embodiments are compounds of formulas IX and X:

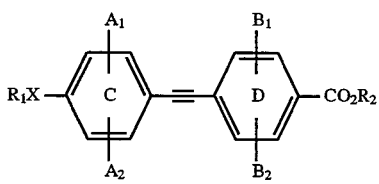

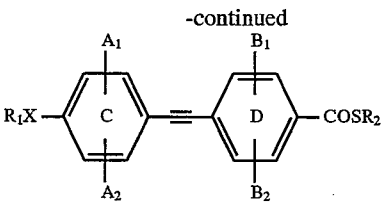

where R$_1$, X, A$_1$, A$_2$, B$_1$, B$_2$, R$_2$ and rings C and D are as defined for formula II. Preferred R$_2$ are alkyl or alkenyl groups having from one to about 18 carbon atoms. Specifically provided are compounds of formula IX and X where X is a single bond or an O atom.

In other specific embodiments, this invention provides LC dopants of formula XI:

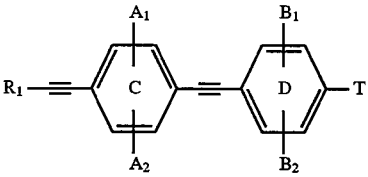

where R$_1$, A$_1$, A$_2$, B$_1$, B$_2$, and rings C and D are as defined for formula I and T is a halogen, haloalkyl, haloalkoxy or vinylhalide group, particularly those having one to about three carbon atoms. Preferred halogens for T groups are chlorine and fluorine, with fluorine more preferred; and XII:

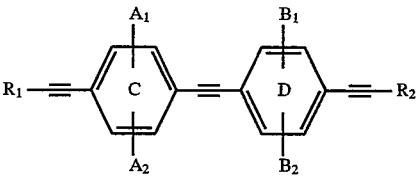

where R$_1$, R$_2$, A$_1$, A$_2$, B$_1$, B$_2$, and rings C and D are as defined for formula II. In yet other embodiments, this invention provides LC dopants, including FLC dopants of formulas XIII and XIV:

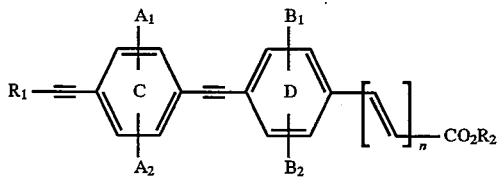

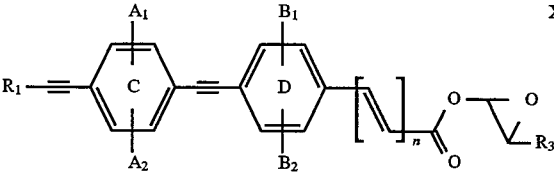

where R$_1$, R$_2$, A$_1$, A$_2$, B$_1$, B$_2$, and rings C and D are as defined for formula II, n is 0 or 1 and R$_3$ is an alkyl group having from 1 to about 18 carbon atoms wherein one or more non-neighboring CH$_2$ can be replaced with an O, S, a double bond, triple bond or an alkylsilyl group, such as a dimethyl silyl group. Preferred R$_3$ are alkyl groups having from 1 to about 18 carbons.

Three-ring core dopants of this invention which impart high birefringence and retain UV stability include compounds of formulas XV, XVI and XVII:

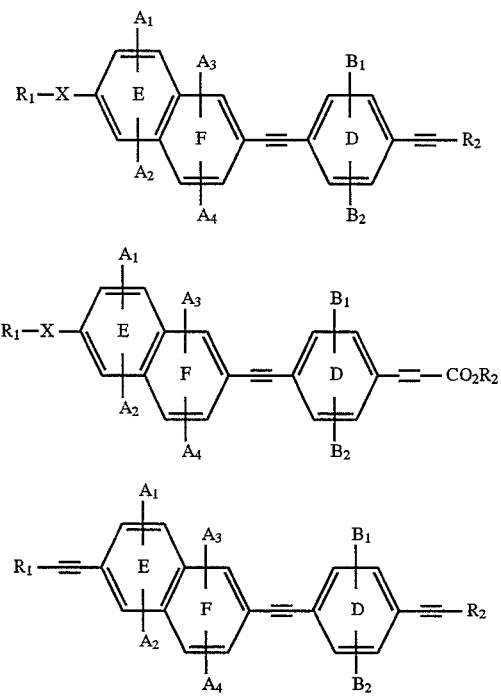

where $R_1$, $R_2$, X, Y, $A_1$, $A_2$, $A_3$, $A_4$, $B_1$, $B_2$, rings C, D, E and F are as defined for formulas III and IV.

Of particular interest for FLC applications are dopants of formulas I–XVII in which one of the tail groups is a chiral nonracemic moiety.

DETAILED DESCRIPTION OF THE INVENTION

High birefringence LC dopants of this invention combine high birefringence tolane-based cores with a variety of chiral nonracemic and achiral LC tail moieties. Preferred high birefringence LC dopants of this invention have at least one of the tails: $R_1$—≡—, $R_2$—O—CO—CH$_2$=CH$_2$.

Exemplary tolane-based cores of this invention include the tolanes of formulas IIa–IIrr and the naphthalene phenylalkyns of formulas IIIa–IIIhh and IVa–IVhh provided in Table 1. The cores of formula IV in Table 1 are reversed with respect to the substituents $R_1$—X— and T— compared to the core formulas labelled III shown. Cores include halogenated tolanes and tolanes in which one or two of the carbons of one or both of the tolane rings are substituted with a nitrogen atom. Preferred nitrogen containing tolane cores are those having pyridine or pyrimidine rings. Tolane cores can be substituted with one or more halogens. Preferred halogenated cores contain one to four halogen atoms. Tolane cores can be substituted with the same or different halogen atoms. Fluorine and chlorine are preferred tolane ring substituents with fluorine being more preferred. Exemplified three-ring tolane-based cores have a 2,6-substituted naphthalene ring and a 1,4-substituted phenyl ring. Either of both of the naphthalene ring and the phenyl ring of the core can be substituted with one or more halogen atoms. Preferred halogenated cores contain one to four halogen atoms. Tolane-based cores can be substituted with the same or different halogen atoms. Fluorine and chlorine are preferred ring substituents with fluorine being more preferred. One or two carbons of either or both of the naphthalene ring and the phenyl ring can be substituted with nitrogen atoms. Nitrogen-containing naphthalene rings useful in tolane-based cores of this invention include among others quinolines, isoquinolines, quinazolines, quinoxalines, cinnolines, napthyridines and pteridines. Those of ordinary skill in the art will appreciate that the substituent numbering pattern for heterocyclic compounds can be different from that of the analogous carbon rings. Thus, the pyridine ring of formula IIr in Table 1 is a 2,5-substituted ring.

Dopants of this invention have at least one LC tail moiety $R_1X$ where X can be a single, double or triple bond, an oxygen atom or a sulfur atom. $R_1$ can be an alkyl, alkene, alkyne, alkoxy, ether, epoxy, silyl alkyl or thioether group among others. $R_1$ groups preferably contain from 3 to about 20 carbon atoms. $R_1$ groups are preferably generally linear, and may contain straight-chain, branched or alicyclic groups such as cyclopropane or cyclohexane, preferably trans-cyclohexane, moieties. Exemplary $R_1$ groups and $R_1X$ groups are listed in Table 2. In general $R_1$ groups can have non-neighboring O, S or Si atoms at any position. Preferred silyl alkyl $R_1$ have a single Si atom, particularly those $R_1$ in which a Si(CH$_3$)$_2$ group is introduced into the tail. $R_1$ groups include perfluorinated or perchlorinated alkyl, alkene, alkyne, ether, thioether, alkoxy and thioalkoxy groups. Preferred ethers and thioethers have one or two O or S atoms, respectively, in the $R_1$ group. Carbon atoms in the $R_1$ group can be halogenated, preferably with chlorine or fluorine and more preferably with fluorine. Silyl alkyl, ether, alkoxy, thioether and thioalkoxy $R_1$ groups can contain double or triple bonds, branched alkyl portions, or alicyclic portions. More preferred $R_1$ are those having about 6 to about 12 carbon atoms.

Dopants in which X is a triple bond, alkynyl- or dialkynyl tolanes, have generally enhanced birefringence compared to simple tolanes. Dopants having a cinnamate ester tail —CH$_2$=CH$_2$—CO—O—$R_2$ are also found to have generally enhanced birefringence.

Dopants of this invention include those in which X contains a cyclohexane or cyclohexene ring, Q, such as where X is Z—Q—W, with Z a single bond, an oxygen atom or a sulfur atom and W a single bond, a —CH$_2$— group, a —CH$_2$—CH$_2$— or a —CH$_2$— group. Cyclohexane and cyclohexene X groups of this invention generally include those with Q substituted with halogens or CN groups, particularly those substituted with fluorine or CN groups. Cyclohexane and cyclohexene-containing X groups are preferably bonded to the $R_1$ group via Z and the tolane core via W at the 4 and 1 ring positions, respectively, in a trans configuration. Preferred cyclohexene X groups have a 1,2 double bond. One or two of the carbons of the cyclohexane X group can be replaced with an oxygen atom. Cyclohexane and cyclohexene X groups can be directly bonded to the core (W is a single bond) or via a —CH$_2$—, —CH$_2$—CH$_2$— or —CH$_2$O— group. Preferred cyclohexane and cyclohexene X groups include those listed in Table 2 (F-I). Preferred Z are a single bond or an oxygen atom.

In $R_1X$ containing-cyclohexene or cyclohexane rings connected to the core by a alkyl chain, it is preferred for improved LC properties that the alkyl chain have an even number of CH$_2$ groups.

Dopants of formula I include tolanes and alkynyl tolanes (e.g., compounds of formula XI) where T is a halogen, haloalkyl, haloalkene or haloalkoxy group. These dopants are particularly useful in twisted nematic applications. Preferred haloalkyl, haloalkene and haloalkoxy groups are those having 1 to 3 carbon atoms. Preferred T groups in this subgroup are those in which the halogen is chlorine or fluorine with fluorine more preferred. More preferred T groups are F, Cl, OCF$_3$, CF$_3$ and CH$_2$CF$_2$.

T of formula I can also be $YR_2$ where Y can be a single, double or triple bond or a —COS—, —CH=CHCOS— or —CH=CHCO$_2$— group. R$_2$ can be an alkyl, alkene, alkyne, alkoxy, ether, epoxy, silyl alkyl or thioether group among others. R$_2$ groups preferably contain from 3 to about 20 carbon atoms. R$_2$ groups are preferably generally linear, and may contain straight-chain, branched or alicyclic groups such as cyclopropane or cyclohexane, preferably trans-cyclohexane, moieties. Exemplary R$_2$ groups and R$_2$Y groups are listed in Table 3. In general R$_2$ groups can have non-neighboring O, S or Si atoms at any position. Preferred silyl alkyl R$_2$ have a single Si atom, particularly those R$_2$ in which a Si(CH$_3$)$_2$ group is introduced into the tail. R$_2$ groups include perfluorinated or perchlorinated alkyl, alkene, alkyne, ether, thioether, alkoxy and thioalkoxy groups. Preferred ethers and thioethers have one or two O or S atoms, respectively, in the R$_2$ group. Carbon atoms in the R$_2$ group can be halogenated, preferably with chlorine or fluorine and more preferably with fluorine. Silyl alkyl, ether, alkoxy, thioether and thioalkoxy R$_2$ groups can contain double or triple bonds, branched alkyl portions, or alicyclic portions. For all Y, generally preferred R$_2$ are alkyl or alkene groups having from 3 to about 20 carbon atoms.

Dopants where both X and Y are triple bonds include dialkynyl tolanes (e.g., formula XII) having generally enhanced birefringence compared to tolanes. Preferred dialkynyl tolanes are those in which R$_1$ and R$_2$ are alkyl or alkene groups.

For dopants of formulas V–XIII, R$_1$ and R$_2$ that are alkyl or alkene groups are generally preferred.

Dopants of this invention also specifically include tolanes and alkynyltolanes in which R$_2$ contains an alkyl epoxide group particularly 1,2 epoxide groups:

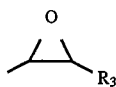

where R$_3$ is as defined above for formula XIV. R$_3$ can be an alkyl, alkene, alkyne, alkoxy, ether, epoxy, silyl alkyl or thioether group among others. R$_3$ groups preferably contain from 1 to about 18 carbon atoms. R$_3$ groups are preferably generally linear, and may contain straight-chain, branched or alicyclic groups such as cyclopropane or cylohexane, preferably trans-cyclohexane, moieties. In general R$_3$ groups can have non-neighboring O, S or Si atoms at any position. Preferred silyl alkyl R$_3$ have a single Si atom, particularly those R$_2$ in which a Si(CH$_3$)$_2$ group is introduced into the tail. R$_3$ groups include perfluorinated or perchlorinated alkyl, alkene, alkyne, ether, thioether, alkoxy and thioalkoxy groups. Preferred ethers and thioethers have one or two O or S atoms, respectively, in the R$_3$ group. Carbon atoms in the R$_3$ group can be halogenated, preferably with chlorine or fluorine and more preferably with fluorine. Silyl alkyl, ether, alkoxy, thioether and thioalkoxy R$_3$ groups can contain double or triple bonds, branched alkyl portions, or alicyclic portions. Generally preferred R$_3$ are alkyl or alkene groups having from 1 to about 18 carbon atoms, with groups having from about 3 to about 10 carbon atoms being more preferred.

Cinnamate esters, compounds of formula I where T is a —CH$_2$=CH$_2$—CO—O—R$_2$ group, having tolane-based cores, particularly those of Table 1, have enhanced birefringence compared to simple tolanes and display excellent UV stability. Preferred cores for cinnamate ester dopants of this invention contain 2 or 3 rings. In dopants having three-ring cores, the cinnamate group can be attached to the phenyl ring or the naphthalene ring. A subset of preferred cinnamate ester dopants of this invention are those of formula I where X is a triple bond.

Compounds of formula I where T is a —CH$_2$=CH$_2$—CO—SR$_2$, —CH$_2$=CA$_2$—CS—OR$_2$ or —CH$_2$=CH$_2$—CS—SR$_2$ group, having tolane-based cores have enhanced birefringence compared to simple tolanes, display excellent UV stability and improved IR clarity over cinnamate esters of formula I.

Dopants of this invention can be chiral non-racemic or achiral compounds. One or both of R$_1$X and T can be chiral non-racemic moieties.

Table 4 provides exemplary formulas 1–32 of dopants of this invention. Where formula variables in Table 4 are not defined they take the definition of the variable given in the text of the summary of the invention. In all cases of the dopants of Table 4, preferred R$_1$, R$_2$ and R$_3$ groups are alkyl or alkene groups.

Table 5 provides specific examples of compounds of this invention.

LC dopants of this invention can be synthesized employing methods disclosed herein in the examples, particularly by reference to Schemes 1–10 (A–C), by methods well-known in the art or by routine adaptation of these methods. Starting materials for synthesis of compounds of formula I, including all of the compounds of Table 4 formulas 1–32, are readily available from commercial sources or by routine synthesis using readily available starting materials.

Fluorocarbon/hydrocarbon ether tails, such as HCF$_2$CF$_2$CF$_2$CH$_2$—O—CH$_2$—O—, can be introduced into the cores of this invention by use or adaptation of routine, well-known techniques, such as those described in Chiang et al. (1991) Mol. Cryst. Liq. Cryst. 208:85–98 and Adams et al. (1990) Mol. Cryst. Liq. Cryst. 183(B):257–267. Compounds of this invention containing cyclohexane, cyclohexene and related rings can be synthesized by well-known methods or by adaptation of well-known methods in view of the descriptions provided herein.

Dopants of this invention are useful as components of LC compositions to impart desired properties noted above to those compositions. Dopants are combined with a suitable LC host material to obtain desired compositions. Dopants of this invention can be combined with suitable nematic or FLC hosts, for example, to generate compositions having enhanced birefringence. Nematic and FLC mixtures of this invention will typically comprise from about 5% to about 50% by weight of one or a mixture of one or more dopants of formula I. Due to mixing incompatibilities and other factors well-appreciated in the art, not all hosts can be combined with all LC dopants. Selection of suitable combinations of hosts with dopants can be routinely made in view of the structures of the components and/or by routine mixing experiments.

Preferred FLC compositions of this invention for use in SSFLC, DHF or related FLC applications have a suitable smectic C phase host and chiral or achiral components to impart any necessary or desirable pitch, tilt angle, polarization or phase properties to which one or more of the dopants of formula I are added to obtained enhanced birefringence. Dopants of formula I may also affect pitch, tilt angle, polarization, phase or other properties of the composition.

Preferred nematic compositions of this invention have a suitable nematic host with any components necessary to impart desired properties to which one or more of the dopants of formula I are added to obtained enhanced birefringence. Dopants of formula I may also affect liquid crystal phase behavior or other properties of the nematic composition.

EXAMPLES

Example 1

Illustrative Synthesis of Tolane Thiocinnamates

Preparation of Octyl 4-[2-(4'-decylthio-3'-fluorophenyl) ethynyl]thiocinnamate MDW470 (See Scheme 1).

1B: 4-Bromo-2-fluorophenol N,N-dimethylthiocarbamate.

A 500 mL three-necked round bottom flask equipped with a magnetic stir bar, a thermometer, and addition funnel was charged with a solution of 5.6 g (0.1 moles) potassium hydroxide in 100 mL water. To this solution was added 19.1 g (0.1 moles) 4-bromo-2-fluorophenol 1A. The solution was stirred in a cooling bath at 10° C., and a solution of 16.48 g (0.133 moles) N,N-dimethylthio-carbonyl chloride in 30 mL tetrahydrofuran was added dropwise to the reaction mixture over 30 minutes. The temperature was kept at less than 12° C. during the addition. After addition was complete, the cooling bath was removed, the solution allowed to warm to room temperature and stirred for an additional 20 minutes. The solution was then made alkaline by addition of 10% KOH, and extracted with three 100 mL portions of toluene. The combined organic layers were washed with brine and dried over magnesium sulfate. The solvent was removed in vacuo and the resultant yellow solid recrystallized from methanol to give 20 g (71%) of an off-white solid.

1D: 4-Bromo-2-fluorothiophenol.

A 50 mL round bottom flask outfitted with an inlet and outlet tube was charged with 4.0 g (14.3 mmoles) of dimethylthiocarbamate 1B. The flask was swept with nitrogen, then heated to 230° C. for 45 minutes in a sand bath. The resultant dimethylcarbamate was cooled, and a solution of 1.1 g (20 mmoles) potassium hydroxide in 10 mL ethylene glycol was added. The diffusion tube was replaced with a reflux condenser, and the reaction mixture was heated at reflux for one hour. The mixture was then cooled, poured onto 5 g ice, and extracted with chloroform. The chloroform layer was discarded, and the aqueous layer was acidified with dilute hydrochloric acid. The aqueous layer was then re-extracted with chloroform, the organic layer was dried over sodium sulfate and concentrated in vacuo to give 1.7 g (57%) of thiol 1D as a brown oil.

1E: 4-Bromo-1-decylthio-2-fluorobenzene

To a 50 mL round bottom flask equipped with a magnetic stir bar was added 0.47 g (2.3 mmoles) thiol 1D, 0.5 g (2.3 mmoles) bromodecane, 0.68 g (2.1 mmoles) cesium carbonate, and 3.5 mL dimethylformamide. A septum was placed in the flask, and the reaction mixture was stirred under nitrogen for 16 hours. The reaction mixture was then poured into dilute hydrochloric acid and extracted with a 1:1 mixture of ethyl acetate:hexane. The combined organic layers were washed with brine, dried over magnesium sulfate, and the solvent removed in vacuo to give a white solid. Purification by column chromatography affords 0.705 g (90%) of thioether 1E as a white solid.

1-(4-Decylthio-3-fluorophenyl)-3-hydroxy-3-methylbutyne.

A 100 mL round bottom flask equipped with a stir bar and a reflux condenser was charged with 0.704 g (2 mmoles) aryl bromide 1E, 0.336 g (4 mmoles) 2-methyl-3-butyne-2-ol, and 50 mL diisopropylamine. The solution was degassed by bubbling argon through it for 45 minutes. Palladium (II) chloride/copper (II) acetate/hexa(triphenylphosphine) catalyst 0.3 g (0.16 mmoles) (Dawson et al., in Polymers for High Technology Electronics and Photonics) (hereafter referred to as the palladium catalyst) was then added, and the mixture was refluxed for 24 hours. The solvent was then removed in vacuo, affording 0.522 g (73%) of alkyne 1F as a colorless oil. The material was carried on to the next step without further purification.

1G: (4-Decylthio-3-fluorophenyl)acetylene.

A 50 mL round bottom flask containing a magnetic stir bar and a reflux condenser was charged with 0.258 g (0.45 mmoles) of alcohol 1F, 5 mg (0.2 mmoles) of a 50% dispersion of sodium hydride in oil, and 10 mL of toluene. The suspension was allowed to stir under reflux 16 hours under a nitrogen atmosphere. The solution was then cooled and 10 mL water was added. The reaction mixture was stirred an additional 10 minutes, then extracted with 1:1 hexane:ethyl acetate. The combined organic layers were washed with brine, dried over magnesium sulfate, and the solvent was removed in vacuo, resulting in 0.115 g (87%) of a pale yellow oil, 1G, which was used without further purification. 1I: 4-Bromocinnamoyl chloride.

To a 250 mL round bottom flask equipped with a magnetic stir bar was added 4.54 g (20 mmoles) of 4-bromocinnamic acid 1H, 100 mL anhydrous benzene, and 5 mL (58 mmoles) oxalyl chloride, and one drop of dimethylformamide. The reaction was allowed to stir 16 hours at room temperature under nitrogen, and the solvent was then removed in vacuo to give 4.85 g (99%) of the acid chloride, 1I, as a yellow solid, mp. 115° C.

1J: Octyl 4-bromothiocinnamate

A 250 mL round bottom flask was charged with 0.736 g (3 mmoles) of acid chloride 1I and 100 mL tetrahydrofuran. Octane thiol (0.44 g, 3 mmoles) was then added dropwise to this solution at room temperature, a reflux condenser was attached, and the reaction mixture was refluxed under nitrogen for 24 hours. The solution was concentrated in vacuo, and the resulting solid was flash chromatographed using 4:1 hexane:ethyl acetate, yielding 0.815 g (71%) of the thiocinnamate, 1J, as a pale yellow solid, mp 57° C.

1K: Octyl 4-[2-(4'-decylthio-3'-fluorophenyl)ethynyl] thiocinnamate.

The method used was as for preparation of 1F.

Quantities used:

| | |
|---|---|
| 1G | 0.292 g (1 mmole) |
| 1J | 0.356 g (1 mmole) |
| palladium catalyst | 0.30 g (0.16 mmole) |
| diisopropylamine | 50 mL |

This gave 0.324 g (58%) of a yellow solid, 1K, mp 74° C.

The method of Example 1 can be employed or readily adapted by choice of starting materials or reaction conditions to the synthesis of sulfur-containing compounds, such as those of formula VIII, including those where X is S:

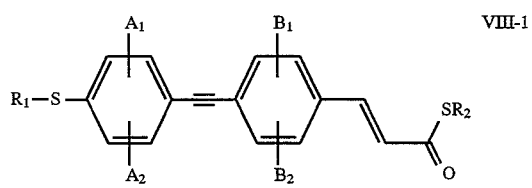

where $R_1$, $R_2$, $A_1$, $A_2$, $B_1$, and $B_2$ are as defined for formula II.

SCHEME 1

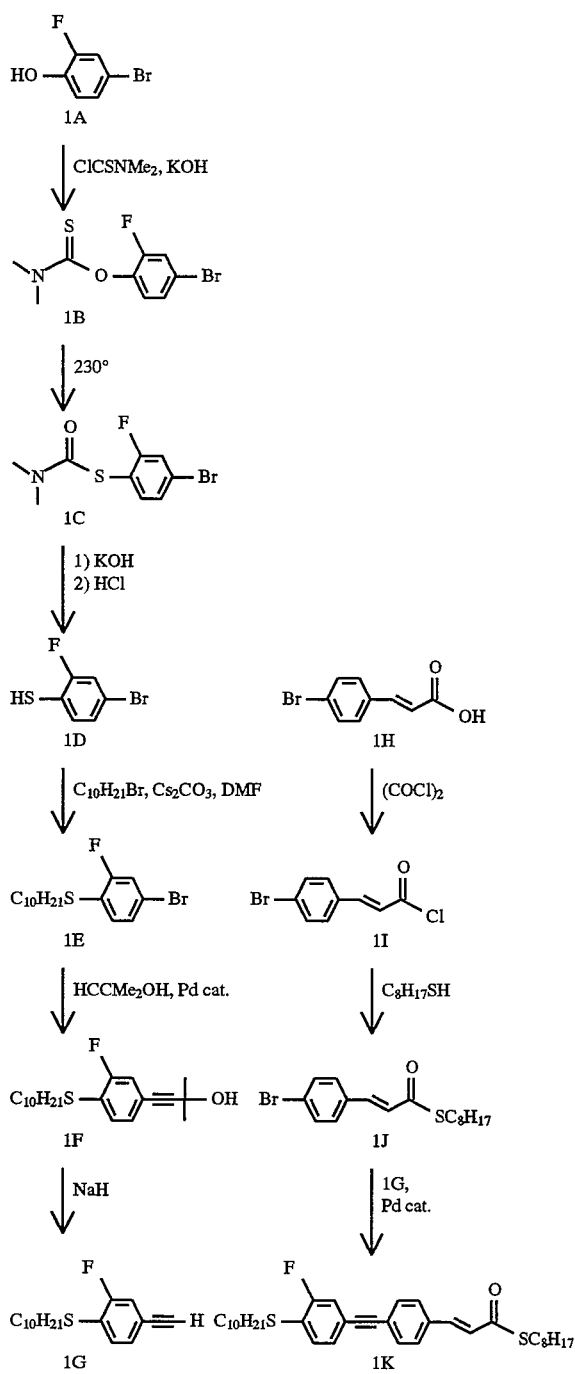

Example 2

Illustrative Synthesis of Chiral Nonracemic Tolane Cinnamates

Preparation of (S,S)-2,3-epoxyhexyl 4-{2-[4'-(R)-3,7-dimethyloctyloxyphenyl]ethynyl}cinnamate MDW265 (see Scheme 2)

2B: (R)-3,7-Dimethyloctan-1-ol.

To a 1000 mL flask containing a stir bar was added 198 g (1.27 moles) R-citronellol and 350 mL ethyl acetate. A slow stream of hydrogen was bubbled through this solution for 15 minutes, and 3.0 g (2.4 mmoles) of 10% PdOH on carbon was added. The reaction was allowed to stir under a slight positive pressure of hydrogen for 48 hours until thin layer chromatography (20:1 hexane:ethyl acetate) showed the reaction to be complete. The solution was filtered through Celite and concentrated in vacuo to give 185 g (92%) of 2B, a colorless oil.

2C: (R)-1-Bromo-3,7-dimethyloctane.

To a 500 mL flask equipped with a stir bar and an addition funnel was added 185.3 g 2B (1.17 moles), and the alcohol was stirred for 10 minutes at 0° C. Phosphorus tribromide (41 mL, 432 mmoles) was then added to the addition funnel, and dripped slowly into the flask, at 0° C., over 1.75 hours. The reaction mixture was allowed to warm to room temperature and stirred for 19 hours. The reaction mixture was diluted with 300 mL hexane and poured into 200 mL water. The organic portion was washed with three 100 mL portions of 6N HCl, then with two 50 mL portions of saturated sodium bicarbonate, and finally dried over magnesium sulfate. The solution was concentrated in vacuo to give 176 g of a light yellow oil. It was distilled at 20 torr to give 118 g (46%) of the bromide 2 C as a colorless oil.

2D: 4-[(R)-3,7-Dimethyloctyloxy]-1-iodobenzene.

To a 250 mL round bottom flask equipped with a magnetic stir bar was added 7.96 g (36.2 mmoles) 4-iodophenol, 8.0 g (36.2 mmoles) 2C, and 50 mL dimethylformamide. The solution was stirred, and then 3.47 g (72 mmoles) of a sodium hydride/oil suspension (1:1) was added. The solution was allowed to stir for 60 hours, then extracted between water and a 1:1 mixture of ethyl acetate and hexane. The combined organic layers were dried over magnesium sulfate and concentrated in vacuo. The resulting yellow oil was dissolved in 200 mL of 4% ethyl acetate in hexanes, then filtered through a 3" plug of silica gel. The silica gel was washed with a further 200 mL of a 5% solution of ethyl acetate in hexanes, and the combined organic layers were stripped in vacuo to yield 12.37 g (95%) of a colorless oil.

2E: 4-[(R)-3,7-Dimethyloctyloxy]-1-(trimethylsilyl) ethynylbenzene

The method used was as for 1F (Example 1)
Quantities used:

| | |
|---|---|
| 2D | 8.55 g (27.3 mmoles) |
| (trimethylsilyl)acetylene | 4.0 mL (24.5 mmoles) |
| palladium catalyst | 358 mg (0.2 mmoles) |
| diisopropylamine | 125 mL |

The dark brown oil was chromatographed using 5% dichloromethane in hexanes to give 7.76 g (99%) of 2E as a colorless oil.

2F: 4-(R)-3,7-Dimethyloctyloxy-1-ethynylbenzene.

To a 500 mL round bottom flask equipped with a stir bar was added 7.76 g (24.4 mmoles) of 2E in 20 mL tetrahydrofuran. To this stirred solution was added 100 mL methanol and 20 mL (234 mmoles) of a 50% potassium hydroxide solution. The reaction was allowed to stir 16 hours at room temperature. The reaction mixture was then concentrated in vacuo and partitioned between ether and water. The combined organic layers were washed with a further two 30 mL portions water and one 30 mL portion of brine containing a small amount of sodium bicarbonate. The solution was dried over magnesium sulfate and concentrated in vacuo to give 5.13 g (82%) of the deprotected alkyne 2F.

2G: Methyl 4-{2-[4'-(R)-3,7-dimethyloctyloxyphenyl] ethynyl}cinnamate

The method used was as for 1F (Example 1)

Quantities used:

| | |
|---|---|
| 2F | 2.46 g (9.5 mmoles) |
| methyl 4-bromocinnamate | 2.3 g (9.5 mmoles) |
| palladium catalyst | 369 mg (0.2 mmoles) |
| diisopropylamine | 50 mL |

The brown solid was chromatographed using 1% ethyl acetate in hexanes to give 2.83 g (71%) of a white solid.

2H: 4-{2[4'-(R)-3,7-Dimethyloctyloxyphenyl]ethynyl}cinnamic acid.

To a 250 mL round bottom flask equipped with a stir bar was added 1.9 g (4.5 mmoles) of ester 2G in 30 mL tetrahydrofuran. To this stirred solution was added 100 mL methanol and 6.8 mL (80 mmoles) of a 50% potassium hydroxide solution. The reaction was allowed to stir 48 hours at room temperature, then was poured into 100 mL of a 3N hydrochloric acid solution. It was extracted with ether, and the combined organic layers were washed twice with water and once with brine, then dried over magnesium sulfate and concentrated in vacuo to give 1.84 g (100%) 2H, a white solid.

2I: 4-{2-[4'-(R)-3,7-Dimethyloctyloxyphenyl]ethynyl}cinnamoyl chloride.

To a 100 mL round bottom flask equipped with a stir bar and a reflux condenser was added 500 mg (1.2 mmoles) of 2H and 3.0 mL (35 mmoles) oxalyl chloride. The reaction mixture was heated to reflux for 5 hours, and the excess oxalyl chloride was distilled off. The reaction mixture was placed on a vacuum line to give 533 mg (102%) of the product 2I.

2K: (S,S)-2,3-Epoxyhexyl4{2-[4'(R)-3,7-dimethyloctyloxyphenyl]ethynyl}cinnamate.

To a 50 mL round bottom flask equipped with a stir bar was added 754 mg (1.8 mmoles) 2I and 40 mL anhydrous THF. To this stirred solution was added (S,S)-2,3-epoxy-1-hexanol 2J (prepared according to Gao et al., J. Amer. Chem. Soc. 1987, 109, 5765), 0.32 mL (2.3 mmoles) triethylamine, and a crystal of dimethylaminopyridine. The reaction was allowed to stir for 16 hours, and was then poured into water and extracted with ether. The combined organic layers were washed with three 20 mL portions of 1N HCl, then with brine, and were dried over magnesium sulfate. The solvent was removed in vacuo and the solid was placed under a 1 torr vacuum for two hours. The resulting solid was chromatographed on silica gel using 5% ethyl acetate in hexanes, then recrystallized from 95% ethanol to give 386 mg (43%) of a white solid, 2K.

The method of this example can be employed or readily adapted by choice of starting materials and reaction conditions for the synthesis of any compounds of formula VII, including compounds of the formulas:

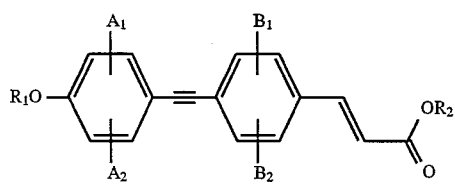

VII-1

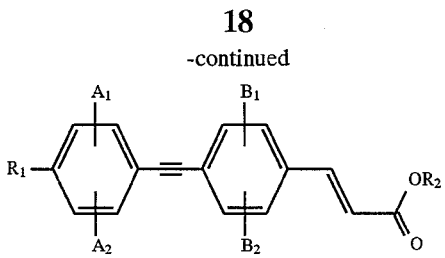

VII-2

Compounds designated MDW682, MDW667 and MDW683 (see Table 5) were synthesized by this method.

SCHEME 2

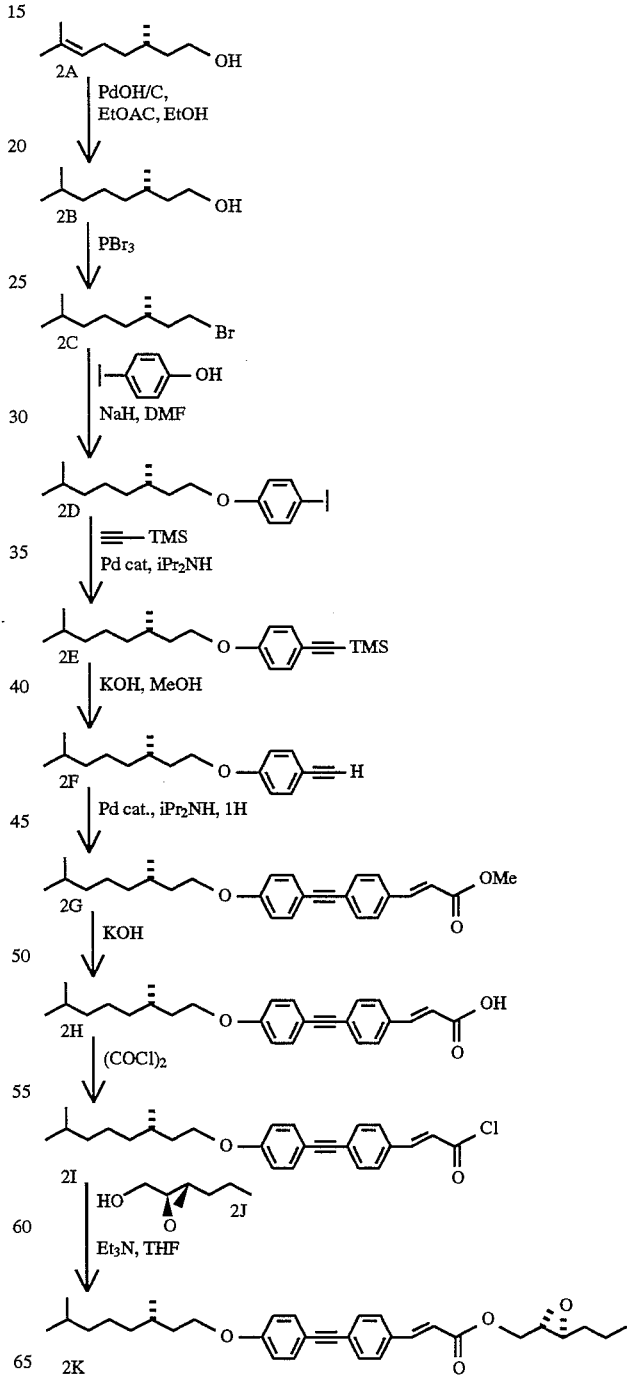

Example 3

Illustrative Synthesis of Tolane Benzoates

Preparation of decyl 4-{2-[4'-(R)-3,7-dimethyloctyloxyphenyl]ethynyl}thiobenzoate MDW472 (see Scheme 3)

3B: Methyl 4-(Trimethylsilyl)ethynylbenzoate.

The method used was as for 1F (Example 1)
Quantities used:

| methyl 4-bromobenzoate | 3.0 g (14 mmoles) |
| --- | --- |
| (trimethylsilyl)acetylene | 2.4 mL (17 mmoles) |
| palladium catalyst | 130 mg (0.07 mmoles) |
| diisopropylamine | 50 mL |

The dark brown solid was chromatographed using 1.5% ethyl acetate in hexanes to give 2.85 g (88%) of 3B, a white solid.

3C: 4-Ethynylbenzoic acid.

The method used was as for 2F (Example 2).
Quantities used:

| 3B | 2.85 g (12.3 mmoles) |
| --- | --- |
| 50% KOH | 18 mL (210 mmoles) |
| methanol | 25 mL |
| tetrahydrofuran | 50 mL |

This reaction gave 1.73 g (97%) of the product 3C.

3D: Methyl 4-ethynylbenzoate.

To a flame-dried 50 mL round bottom flask equipped with a stir bar was added 1.23 g (8.5 mmoles) of acid 3C, 25 mL dimethylformamide, 1.05 mL (17 mmoles) iodomethane, and 2.8 g (33.8 mmoles) sodium bicarbonate. The reaction was allowed to stir for 16 hours at room temperature and was then poured into water and extracted with a 1:1 mixture of ethyl acetate and hexanes. The combined organic layers were washed with two 20 mL portions of water, then with brine, and were dried over magnesium sulfate. The solvent was removed in vacuo to give 1.19 g (88%) of a yellow solid, which was dissolved in 1% ethyl acetate in hexanes and passed through a 3" plug of silica gel to give 1.18 g of a white solid.

3E: 4-{2-[4'-(R)-3,7-Dimethyloctyloxyphenyl]ethynyl}benzoic acid.

The acetylene 3D and the aryl iodide 2D were first coupled using the method for 1F (Example 1).
Quantities used:

| 3D | 0.42 g (2.6 mmoles) |
| --- | --- |
| 2D (Example 2) | 0.95 g (2.6 mmoles) |
| palladium catalyst | 50 mg (0.03 mmoles) |
| diisopropylamine | 50 mL |

The ester was then hydrolyzed using the method for 2H (Example 2).
Quantities used:

| 1% KOH in H2O | 38 mL (6.8 mmoles) |
| --- | --- |
| methanol | 50 mL |

The material was chromatographed using 40% ethyl acetate in hexanes to give 0.482 g (48%) of the product 3E.

3F: 4-{2[4'-(R)-3,7-Dimethyloctyloxyphenyl]ethynyl}benzoyl chloride.

The method used was as for 1I (Example 1).

Quantities used:

| 3E | 0.33 g (0.87 mmoles) |
| --- | --- |
| oxalyl chloride | 0.38 mL (4.3 mmoles) |
| benzene | 10 mL |

The product 3F was used in the next step without purification.

3G: Decyl 4-{2-[4'-(R)-3,7-dimethyloctyloxyphenyl]ethynyl}thiobenzoate.

The method used was as for 1J (Example 1).
Quantities used:

| 3F | 0.346 g (0.87 mmoles) |
| --- | --- |
| decyl mercaptan | 0.174 g (1.0 mmoles) |
| triethylamine | 0.14 mL (1.0 mmoles) |
| tetrahydrofuran | 20 mL |

The product was purified by chromatography to yield 0.319 g (68%) 3G of a white solid.

This method can be employed or readily adapted to the synthesis of compounds of formulas IX, including those of formulas:

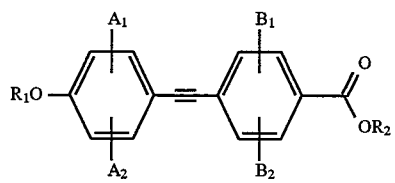

IX-1

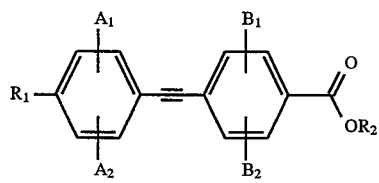

IX-2

SCHEME 3

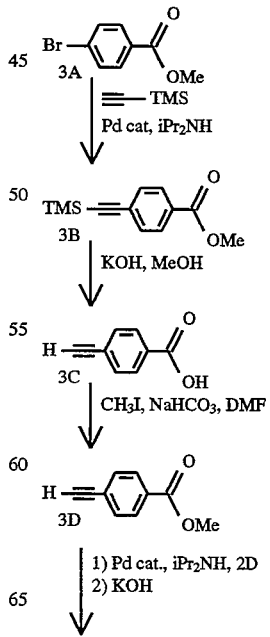

-continued
SCHEME 3

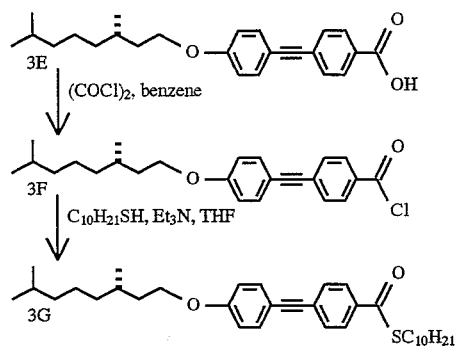

Example 4

Illustrative Synthesis of Alkynyl Tolanes

Preparation of 4-(3',4'-difluorophenylethynyl) phenyl-1-hexane MDW697 (Scheme 4)

4B: 1-(4-Bromophenyl)1-hexyne.
The method used was as for 1F (Example 1)
Quantities used:

| | |
|---|---|
| 4-bromoiodobenzene - 4A | 5.86 g (20.7 mmoles) |
| 1-hexyne | 1.64 g (20 mmoles) |
| palladium catalyst | 200 mg (0.11 mmoles) |
| diisopropylamine | 40 mL |

The product was passed through 3 inches silica gel using hexanes to give 4.564 g (93%) 4B, a pale yellow solid.

4C: 1-[4-(1-Hexynyl)phenyl]-3-hydroxy-3-methylbutyne.
The method used was as for 1F (Example 1).
Quantities used:

| | |
|---|---|
| 4B | 0.741 g (3.1 mmoles) |
| 2-methyl-3-butyne-2-ol | 0.378 g (4.5 mmoles) |
| palladium catalyst | 74 mg (0.04 mmoles) |
| diisopropylamine | 30 mL |

The product was chromatographed using 2% ethyl acetate in hexanes to give 0.716 g (95%) 4C, a yellow oil.

4D: 1-(4-Ethynylphenyl)-1-hexyne.
The method used was as for 1G (Example 1).
Quantities used:

| | |
|---|---|
| 4C | 0.716 g (2.98 mmole) |
| 50% NaH/oil dispersion | 69 mg (2.86 mmole) |
| toluene | 85 mL |

This gave 0.503 g (93%) 4D, a pale yellow oil.

4E: 4-(3',4'-Difluorophenylethynyl)phenyl-1-hexyne.
The method used was as for 1F (Example 1).
Quantities used:

| | |
|---|---|
| 4D | 0.222 g (1.2 mmoles) |
| bromo-3,4-difluorobenzene | 0.232 g (1.2 mmoles) |
| palladium catalyst | 22 mg (0.012 mmoles) |
| diisopropylamine | 12 mL |

The product was recrystallized from hexane to give 0.233 g (65%) 4E, a white solid.

The method of Example 4 can be employed or readily adapted by choice of starting materials or reaction conditions for synthesis of compounds of formula XI, including those of the formula:

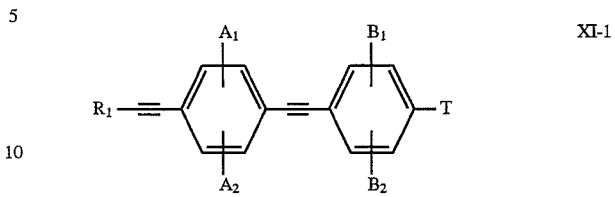

where $R_1$, $R_2$, $A_1$, $A_2$, $B_1$, and $B_2$ are as defined for formula II and T is a halogen, haloalkyl, haloalkoxy or vinylhalide group.

This method can be employed to synthesize MDW696, 674 and 668 (see Table 5).

SCHEME 4

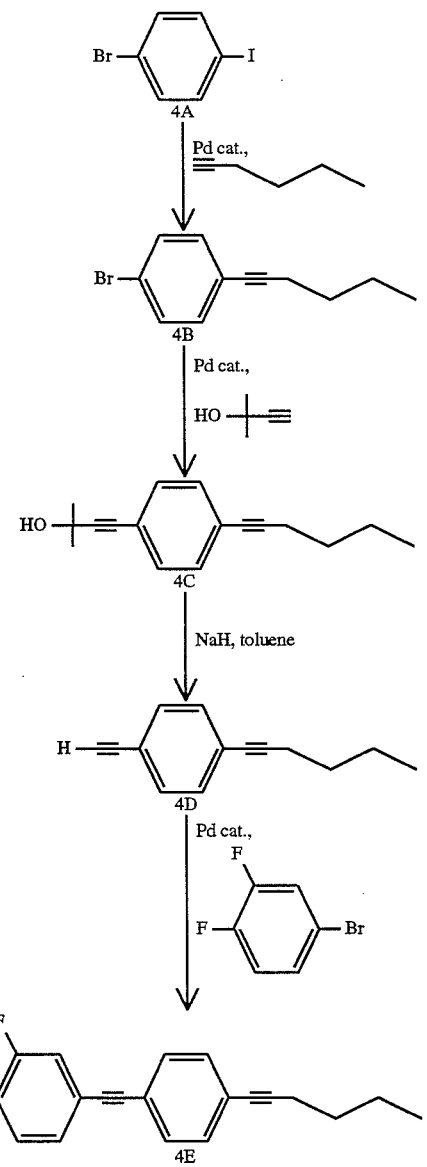

Example 5

Illustrative Synthesis of Dialkynyl Tolanes
(Preparation of di[4-(1-hexynyl)phenyl]acetylene.) (Scheme 5)

5A: 1-(4-Bromophenyl)-3-hydroxy-3-methylbutyne.
The method used was as for 1F (Example 1).
Quantities used:

| | |
|---|---|
| 4A (Example 4) | 7.33 g (25.9 mmoles) |
| 2-methyl-3-butyne-2-ol | 2.1 g (25 mmoles) |
| palladium catalyst | 73 mg (0.04 mmoles) |
| diisopropylamine | 50 mL |

The product was 5.34 g (89%) 5A, a pale yellow oil.

5B: 4-Bromoethynylbenzene
The method used was as for 1G (Example 1).
Quantities used:

| | |
|---|---|
| 5A | 5.229 g (22 mmole) |
| 50% NaH/oil dispersion | 101 mg (21 mmole) |
| toluene | 52 mL |

This gave 3.84 g (97%) 5B, a yellow solid.

5C: Di-(4-bromophenyl)acetylene.
The method used was as for 1F (Example 1).
Quantities used:

| | |
|---|---|
| 4A (Example 4) | 1.465 g (5.2 mmoles) |
| 5B | 0.955 g (5.3 mmoles) |
| palladium catalyst | 50 mg (0.027 mmoles) |
| diisopropylamine | 50 mL |

The product was 1.54 g (86%) 5C, a yellow solid.

5D: Di-[4-(1-hexynyl)phenyl]acetylene.
The method used was as for 1F (Example 1).
Quantities used:

| | |
|---|---|
| 5C | 1.068 g (3 mmoles) |
| 1-hexyne | 0.246 g (3 mmoles) |
| palladium catalyst | 10.6 mg (5.7 μmoles) |
| diisopropylamine | 30 mL |

The product was 0.692 g (64%) 5D, a white solid.

This method can be employed or readily adapted by choice of starting materials or reaction conditions to synthesis of compounds of the formula XII, including those of formula:

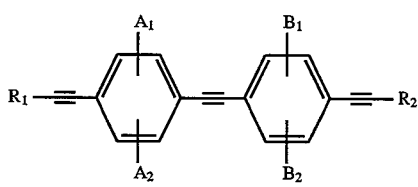

XII-1

This method is preferred where $R_1=R_2$. When asymmetric dialkynyl tolanes are synthesized ($R_1 \neq R_2$ in formula above), Example 4 can be adapted to couple an appropriately substituted aryl bromide, like 4B, with an appropriately substituted arylacetylene, like 4D. See Hird, M. and Toyne, K.J. (1993) supra, for examples of cross-coupling reactions which can be used or readily adapted to synthesis of tolanes where $R_1 \neq R_2$ as well as to synthesis of tolanes having aromatic rings containing nitrogen.

SCHEME 5

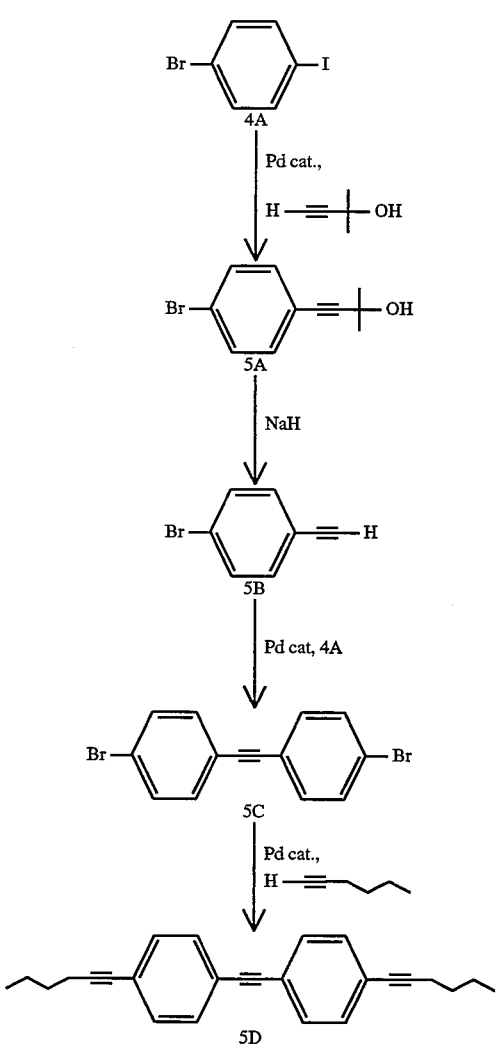

Example 6

Illustrative Synthesis of Alkynyl Tolane Cinnamates

Preparation of 2-methylbutyl 4-{2-[4'-(1-hexynyl)phenyl]ethynyl}cinnamate MDW758 (see Scheme 6).

6B: 4-Bromocinnamoyl chloride.
The method used was as for 1I (Example 1).
Quantities used:

| | |
|---|---|
| 4-bromocinnamic acid | 12.0 g (53 mmoles) |
| 2-methyl-3-butyne-2-ol | 20.2 g (159 mmoles) |
| toluene | 105 mL |

The product was 13.0 g (100%) 6B, a yellow solid.

6C: 2-Methylbutyl 4-bromocinnamate.
The method used was as for 2K (Example 2).
Quantities used:

| | |
|---|---|
| 6B | 4.91 g (20.0 mmoles) |
| 2-methylbutanol | 2.00 mL (18.5 mmoles) |

-continued

| | |
|---|---|
| triethylamine | 2.88 mL (20.6 mmoles) |
| tetrahydrofuran | 80 mL |

The product was 3.26 g (55%) 6C, a pale yellow oil.
6D: 2-Methylbutyl 4-(2-trimethylsilylethynyl)cinnamate.
The method used was as for 1F (Example 1).
Quantities used:

| | |
|---|---|
| 6C | 7.33 g (13 mmoles) |
| trimethylsilylacetylene | 2.55 g (26 mmoles) |
| palladium catalyst | 0.39 g (0.21 mmoles) |
| diisopropylamine | 50 mL |

The product was passed through 5 cm silica gel using 10% ethyl acetate in hexanes and concentrated in vacuo to give 3.92 g (95%) 6D, a red oil.
6E: 2-Methylbutyl 4-ethynylcinnamate.

To a 200 mL round bottom flask containing a magnetic stir bar was added 3.77 g (12 mmoles) 6D, 50 mL tetrahydrofuran, 36 mL (36 mmoles) of a 1M solution of tetrabutylammonium fluoride in tetrahydrofuran, and 0.69 g (12 mmoles) of potassium fluoride. The solution was allowed to stir 16 hours, and was then poured into water and extracted with a 1:1 mixture of ethyl acetate in hexane. The combined organics were washed with brine, dried over magnesium sulfate, and concentrated in vacuo. The resulting oil was chromatographed on silica gel using 3% ethyl acetate in hexanes to give 0.452 g (16%) 6E, a colorless oil.
6F: 2-methylbutyl 4-{2-[4'-(1-hexynyl)phenyl] ethynyl}cinnamate.
The method used was as for 1F (Example 1).
Quantities used:

| | |
|---|---|
| 6E | 0.242 g (1.00 mmoles) |
| 4B (Example 4) | 0.237 g (1.00 mmoles) |
| palladium catalyst | 24 mg (0.013 mmoles) |
| diisopropylamine | 10 mL |

The product was passed through a plug of silica gel using 50% ethyl acetate in hexanes and concentrated in vacuo. The resulting oil was chromatographed on silica gel using 5% ethyl acetate in hexanes to give 0.215 g (54%) 6F, a white solid (Rf 0.21 with 10% ethyl acetate in hexane), which was recrystallized from hexane.

The method of this example can be used or readily adapted to make compounds of the formula XIII, including those of formula:

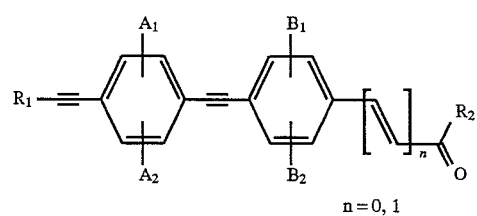

XIII-1 n = 0, 1

SCHEME 6

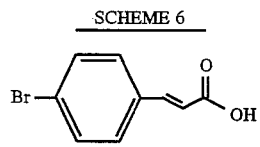

-continued
SCHEME 6

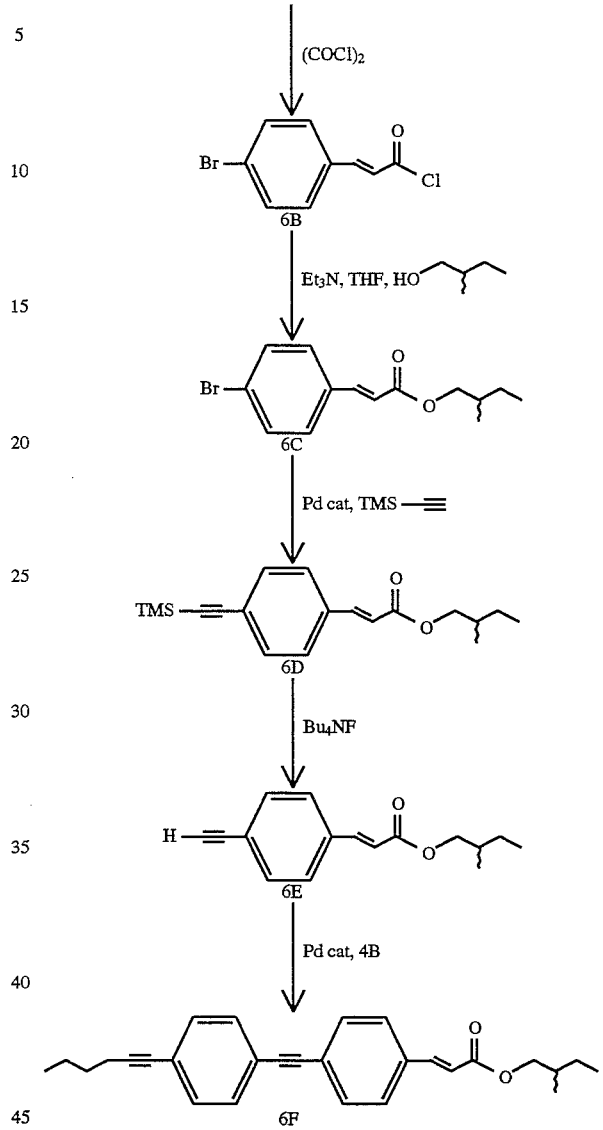

Example 7

Illustrative Synthesis of pyridine-Containing Alkynyl Tolanes

Preparation of 2-{2-[4'-(1-hexynyl)phenyl]ethynyl}-5-octyloxypyridine
7B. The method used is as for 1F (Example 1)
Quantities used:

| | |
|---|---|
| 5B (Example 5) | 1.00 g (5.52 mmoles) |
| dibromopyridine | 1.44 g (6.08 mmoles) |
| palladium catalyst | 54 mg (0.029 mmoles) |
| diisopropylamine | 11 mL |

The product 7B is purified by silica gel chromatography.
7C. 2-[2[(4'Bromophenyl)ethynyl]-5-hydroxypyridine.

A 50 mL round bottom flask containing a magnetic stir bar is charged with 1.70 g (5.04 mmoles) 7B, 1.21 g (30.3 mmoles) sodium hydroxide, and 15 mL diethyleneglycol. The reaction mixture is heated, with stirring, under nitrogen at 200° C. for 5 hours. The reaction mixture is then neutralized with 5% acetic acid in water, and extracted five times with a 1:1 hexane:ethyl acetate solution. The combined organic layers are dried over sodium sulfate and concentrated in vacuo.

7D. 2-[2-(4'Bromophenyl)ethynyl]-5-octyloxypyridine.
The method used is as for 1E (Example 1)
Quantities used:

| 7C | 600 mg (2.19 mmoles) |
| bromooctane | 0.42 mL (2.41 mmoles) |
| cesium carbonate | 750 mg (2.30 mmoles) |
| dimethylformamide | 7 mL |

To ensure complete reaction, the stirred reaction mixture is heated to 80° C. for two hours prior to a normal workup.
7E. 2-{2-[4'-(1-Hexynyl)phenyl]ethynyl}-5-octyloxypyridine.
The method used is as for 1F (Example 1).
Quantities used:

| 7D | 700 mg (1.81 mmoles) |
| 1-hexyne | 180 mg (2.2 mmoles) |
| palladium catalyst | 18 mg (9.4 μmoles) |
| diisopropylamine | 5 mL |

The product 7E is purified by silica gel chromatography and subsequent recrystallization.

This method can be employed or readily adapted by choice of starting materials and reaction conditions to synthesis of pyridine-containing compounds of formulas, such as:

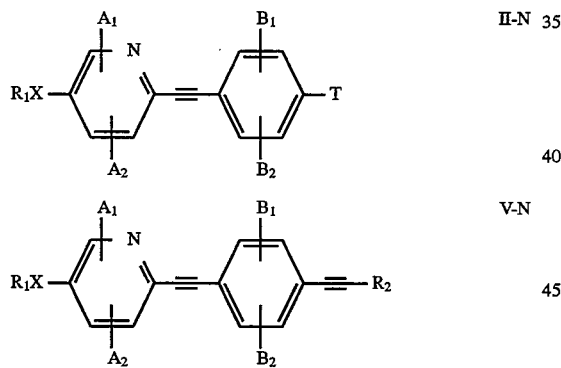

II-N

V-N

SCHEME 7

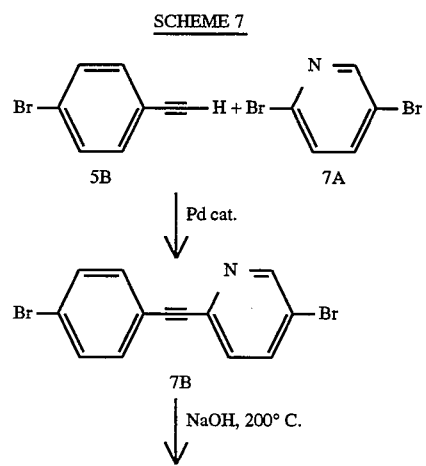

-continued
SCHEME 7

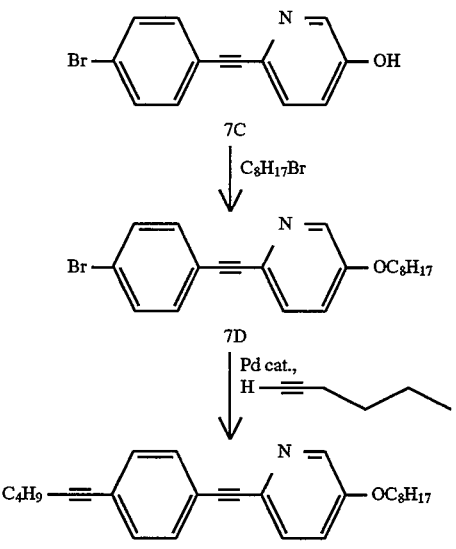

Example 8

Illustrative Synthesis of Pyrimidine-Containing Alkynyl Tolanes 8B. 5-Bromo-2-[2-(4'bromophenyl)ethynyl]pyrimidine.
The method used is as for 1F (Example 1).
Quantities used:

| 5 B (Example 5) | 800 mg (4.42 mmoles) |
| dibromopyrimidine | 1.16 g (4.86 mmoles) |
| palladium catalyst | 43 mg (0.023 mmoles) |
| diisopropylamine | 10 mL |

The dibromopyrimidine starting material is prepared according to Crosby, D. G., Bethold, R. V., J. Org. Chem. 1960, 25, 1916–1919. The product 8B is purified by silica gel chromatography.

8C. 1-[2-(4'Bromophenyl)ethynyl]-5-hydroxypyrimidine.
The method used is as for 7C (Example 7).
Quantities used:

| 8B | 1.30 g (3.85 mmoles) |
| sodium hydroxide | 0.92 g (23 mmoles) |
| diethyleneglycol | 12 mL |

8D. 2-[2-(4'Bromophenyl)ethynyl]-5-octyloxypyrimidine.
The method used is as for 1E (Example 1).
Quantities used:

| 8C | 500 mg (1.88 mmoles) |
| bromooctane | 0.35 mL (2.0 mmoles) |
| cesium carbonate | 622 mg (1.91 mmoles) |
| dimethylformamide | 6 mL |

To ensure complete reaction, the stirred reaction mixture is heated to 80° C. for two hours prior to a normal workup.
8E. 2-{2-[4'-(1-Hexynyl)phenyl]ethynyl}-5-octyloxypyrimidine.

The method used is as for 1F (Example 1).

Quantities used:

| | |
|---|---|
| 8D | 500 mg (1.29 mmoles) |
| 1-hexyne | 130 mg (1.6 mmoles) |
| palladium catalyst | 13 mg (6.7 μmoles) |
| diisopropylamine | 5 mL |

The product is purified by silica gel chromatography and subsequent recrystallization.

This method can be employed or readily adapted by choice of starting materials and reaction conditions to synthesis of pyrimidine-containing compounds of formulas such as:

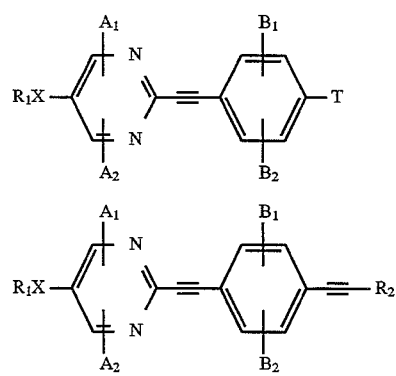

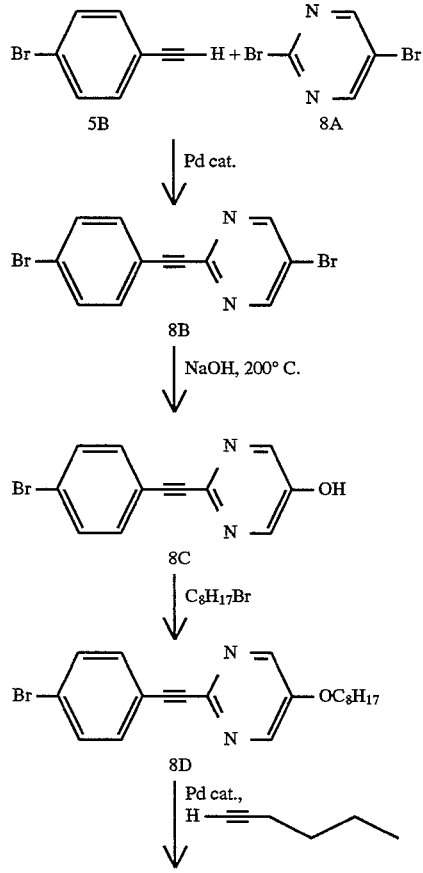

-continued
SCHEME 8

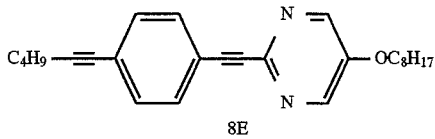

In view of the directions provided in Examples 1–8 and techniques well-known in the art, those of ordinary skill in the art of organic synthesis can readily prepare pyridine- and Pyrimidine-containing compounds of this invention XVIII, XIX, XX and XXI:

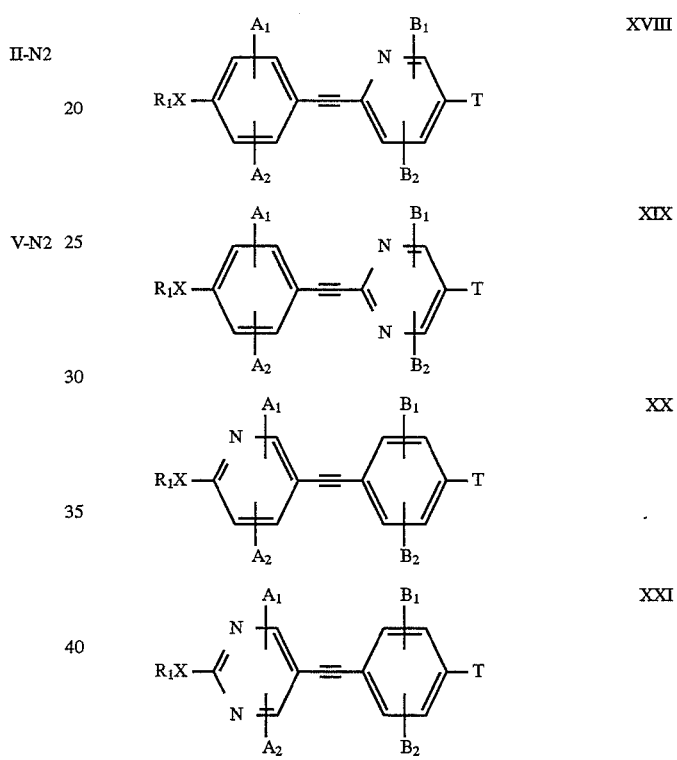

Example 9

Illustrative Synthesis of Compounds of Formulas:

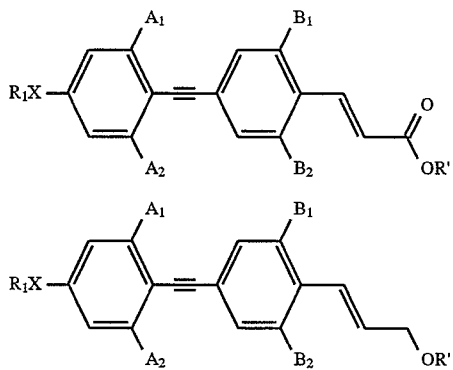

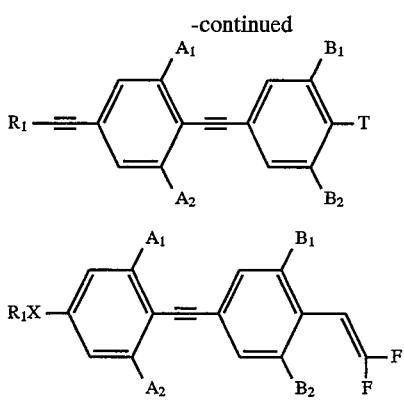

$R_1$=as defined above for formula I;
X=single or triple bond
T=Cl , $OCF_3$, $CF_3$, $CF_2H$, or R'—≡—
$A_1$, $A_2$, $B_1$, $B_2$=H, F, or Cl; and cinnamate to give a tolane cinnamate. If desired, the ester group can be derivatized by sequential hydrolysis, conversion to an acid chloride, and reaction with an alkanol to give the tolane cinnamate 9I.

A tolane having the difluoroethylene group is synthesized by starting with the bromobenzaldehyde 9J. This compound is treated with the difluoro Wittig reagent 9K to give the difluorostyrene 9L. The bromobenzene is then treated with alkyne 9E, using the palladium catalyst, to give tolane 9M.

Similar tolanes are made by appropriate substitution on the two benzene rings. For example, the chlorinated compounds are made by using benzene rings which had chlorines instead of fluorines; the alkylated compounds (where A is a single bond) are made by using alkylated halobenzenes; and the compounds with a chlorine in the 4' position are made using chlorobromobenzene as the coupling aromatic ring.

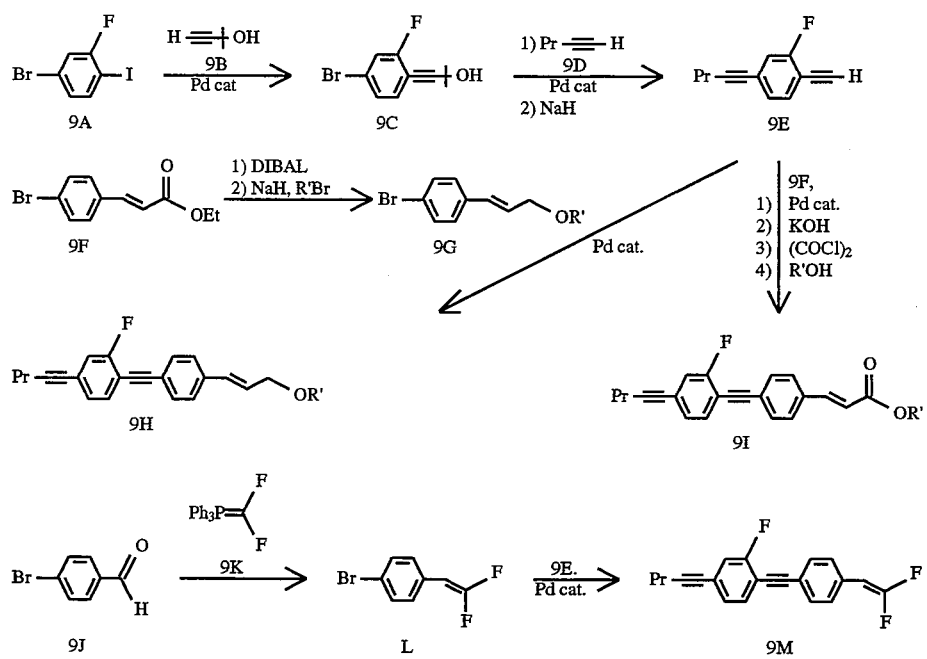

SCHEME 9

R'=alkyl, alkenyl, ether, thioether and alkynyl groups.

The syntheses of several representative members of tolane families shown above are illustrated in Scheme 9. Thus, the synthesis of the cinnamate and the styrene ether both start with the bromofluoroiodobenzene 9A. If other substitution patterns are required, the starting material is chosen accordingly. The halogenated benzene is treated with 3-hydroxy-3-methylbutyne 9B in the presence of a palladium catalyst to give the alkynylbenzene 9C. This compound is alkynated again using pentyne 9D and the same catalyst to give the dialkyne. The protecting group is then removed to give the unprotected dialkyne 9E.

The ethyl bromocinnamate 9F is treated with diisobutylaluminum hydride (DIBAL) to give the alcohol, which is then coupled with an alkyl bromide to give the styrene ether 9G. This ether is then coupled with alkyne 9E, again using a palladium catalyst, to give the tolane styrene 1H. Alternatively, the alkyne can be coupled with the original Example 10

Illustrative Synthesis of Three-Core Dopants

The syntheses of several representative types of compounds of formulas III and IV are illustrated in Schemes 10A, 10B and 10C. Starting materials and reagents are chosen as will be apparent to those of ordinary skill in the art to obtain the desired ring substitution patterns. Starting materials for naphthalene-derived rings are either commercially available or readily prepared from commercially available materials by well-known methods. In particular, various halogenated and otherwise substituted naphthalenes, quinolines, isoquinolines, cinnolines, quinazolines, quinoxalines, napthyridines and pteridines are commercially available or readily prepared from available materials by well-known methods.

Scheme 10 A
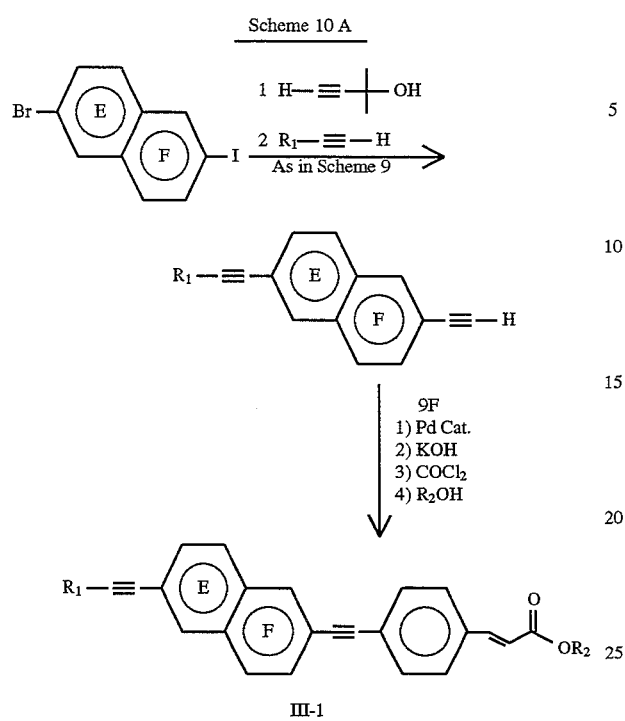
III-1
Scheme 10 B
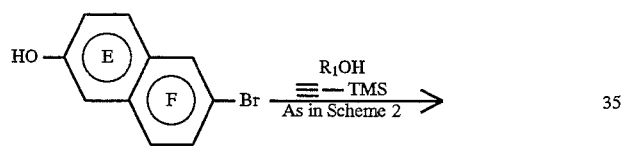
Scheme 10 B
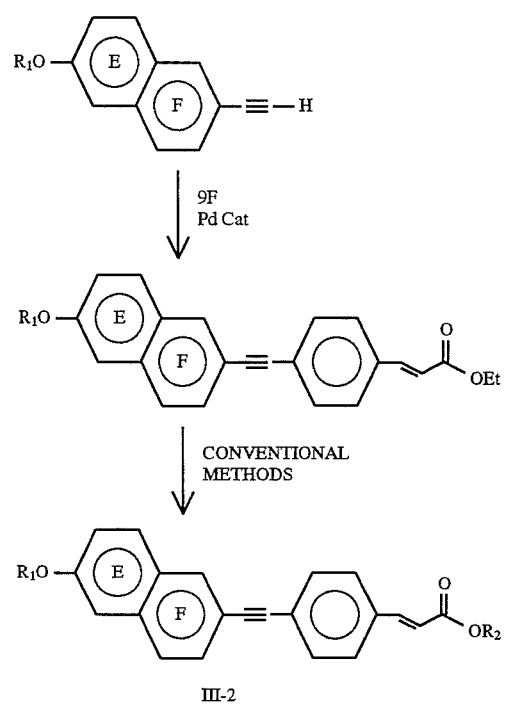
III-2
Scheme 10 C
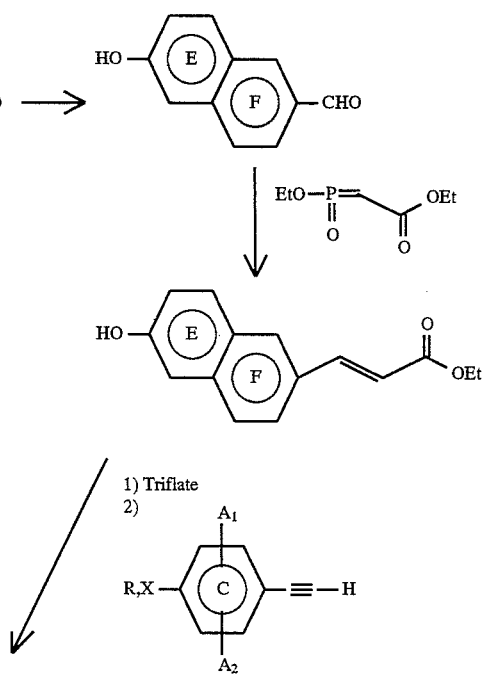

-continued
Scheme 10 C

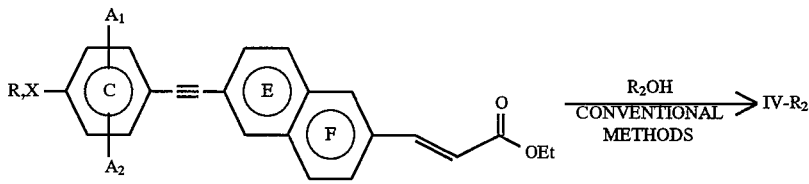

IV-1 where $T = -CH_2=CH_2-CO_2-R_2$

Example 11

Illustrative High Birefringence Host Mixtures

A 10% (w/w) mixture of MDW758 in MX6111 (an achiral Smectic C host with Δn=0.152 [see Table 8]) was prepared. This mixture has the phase diagram:

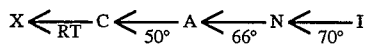

The C-phase $n_e$ was 1.669, $n_o$ was 1.491 and Δn=0.178.

A 10% (w/w) mixture of MDW758 in RDK 1160 (a commercially available nematic host) was prepared. In the nematic phase $n_e$=1.717, $n_o$=1.507 and Δn=0.210. The mixture has the phase diagram:

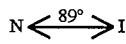

RDK 1160 has I to N transition 95° C., $n_e$=1.708, $n_o$=1.506 and Δn (20° C.)=0.202.

A 10% (w/w) mixture of MDW682 in MX6111 was prepared. This mixture has the phase diagram:

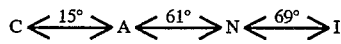

In the C phase, $n_e$=1.663, $n_o$=1.492 and Δn=0.171.

A 10% (w/w) mixture of MDW682 in RDK 1160 was prepared. MDW682 was compatible with the host. The mixture displayed a small (5° C.) suppression of the I-N transition. In the nematic phase, $n_e$ =1.720, $n_o$=1.508 and Δn=0.212.

A 10% (w/w) mixture of MDW683 in RDK 1160 was prepared. Compatibility of MDW683 with the host was excellent; only a 1° C. suppression of the I-N transition was observed. In the nematic phase, $n_e$=1.718, $n_o$=1.506 and Δn=0.212.

A 10% (w/w) mixture of MDW696 in RDK 1160 was prepared. Only a 3° C. drop in the I-N transition was observed. In the nematic phase, $n_e$=1.723, $n_o$=1.509 and Δn=0.214.

A 10% (w/w) mixture of MDW675 in RDK 1160 was prepared. The I-N transition in the mixture dropped to 86° C. The Δn=0.222 with $n_e$=1.728 and $n_o$=1.506.

The following mixtures of MDW915, MDW917 and MDW920 were made in the nematic host RDK 1160 with the following results:

| Dopant (MDW) | % (w/w) dopant | $n_e$ | $n_o$ | Δn (20° C.) | I-N (°C.) | UV Stability |
|---|---|---|---|---|---|---|
| 915 | 10 | 1.725 | 1.510 | 0.215 | 85 | VH |
| 915 | 20 | 1.751 | 1.512 | 0.238 | 104 | VH |
| 917 | 10 | 1.731 | 1.511 | 0.220 | 92 | VH |
| 917 | 20 | 1.755 | 1.515 | 0.240 | 92 | VH |
| 920 | 10 | 1.710 | 1.511 | 0.207 | | VH |

See Example 12 for details regarding the measurement of UV stability.

Dopants MDW915, MDW917 and MDW920 display the following phase behavior:

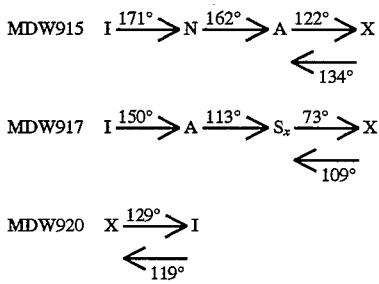

Birefringence was measured using an Abbe refractometer as is known in the art. Herein, low Δn means less than about 0.13, moderate Δn means about 0.13 to about 0.17, high Δn means about 0.17 to about 0.25, and very high Δn means greater than about 0.25.

Example 12

UV-stability of Compounds of the Present Invention

Stability of compounds to UV light was qualitatively assessed by measuring the length of irradiation time required to cause discoloration (yellow/brown color). A 1% (w/v) solution of the compound in a compatible solvent was dried onto a silica gel plate. The plate was then exposed to UV irradiation at 254 nm. The appearance of a yellow/brown color on the plate (visual observation) indicated that decomposition had begun. For qualitative comparisons herein, low stability means discoloration in less than about 1 min of irradiation, moderate stability is discoloration in about 1 to 4 min, high stability is discoloration in about 4–10 min, very high stability is discoloration only after 10 min or more irradiation.

Employing this qualitative test, MDW696 and MDW675 were observed to begin to discolor after about 5 minutes of UV irradiation. In comparison, MDW683 and MDW682 were considerably more stable to UV irradiation. No discoloration was observed after two hours of UV irradiation. Typically, if a compound did not discolor after about 10 min of irradiation, it was found to be stable for a significantly longer time.

Those of ordinary skill in the art will appreciate that techniques, procedures, methods and schemes other than those specifically described herein can be employed to make and use the compounds and compositions of this invention. All routine modification and adaptations of the compounds, compositions and methods of this invention are considered to fall within the spirit and scope of this invention. It is not intended that the invention be limited only to those materials, methods and compositions specifically described.

TABLE 1

Exemplary Cores $R_1X-C-\equiv-D-T$    I

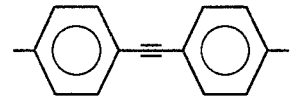  IIa

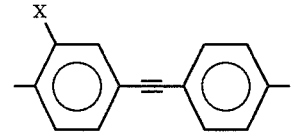  IIb
X = F,Cl

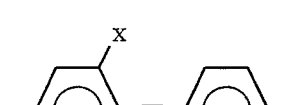  IIc
X = F,Cl

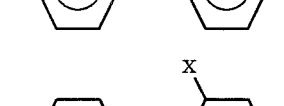  IId
X = F,Cl

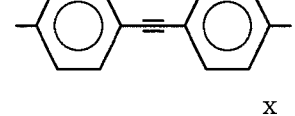  IIe
X = F,Cl

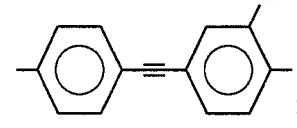  IIf
X = F,Cl

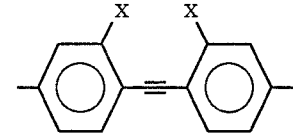  IIg
X = F,Cl

TABLE 1-continued

Exemplary Cores

  IIh
X = F,Cl

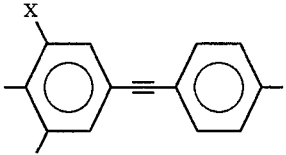  IIi
X = F,Cl

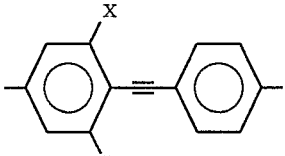  IIj
X = F,Cl

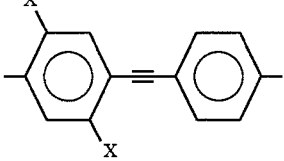  IIk
X = F,Cl

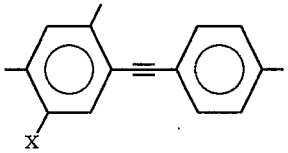  IIl
X = F,Cl

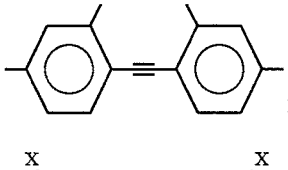  IIm
X = F,Cl

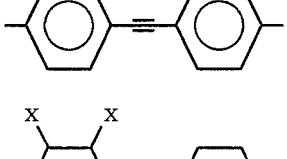  IIn
X = F,Cl

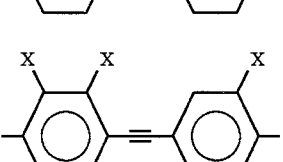  IIo
X = F,Cl

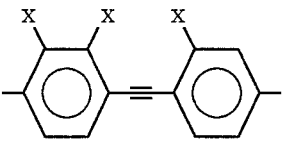  IIp
X = F,Cl

TABLE 1-continued
Exemplary Cores
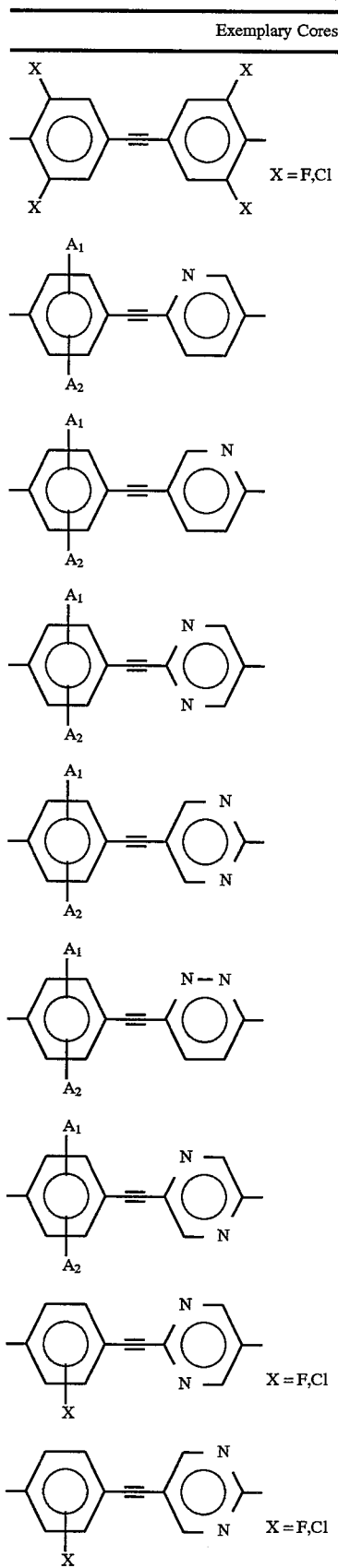
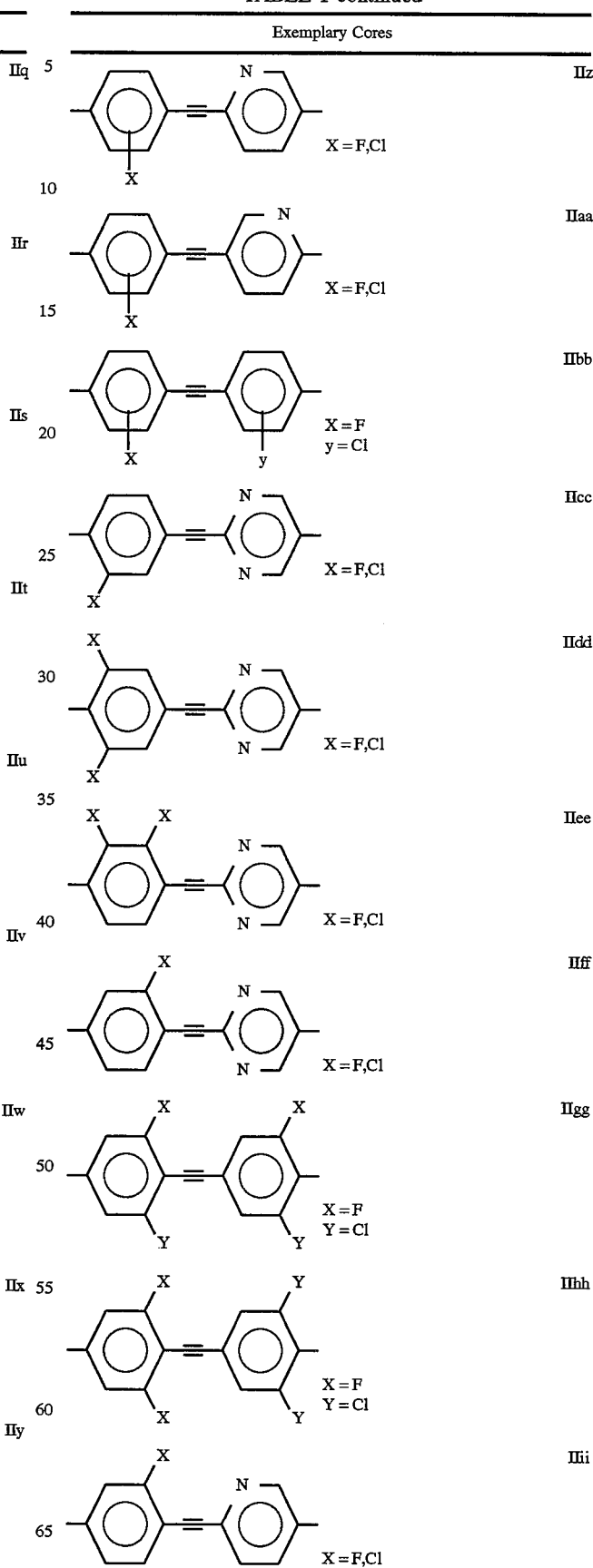

TABLE 1-continued

Exemplary Cores

TABLE 1-continued
Exemplary Cores
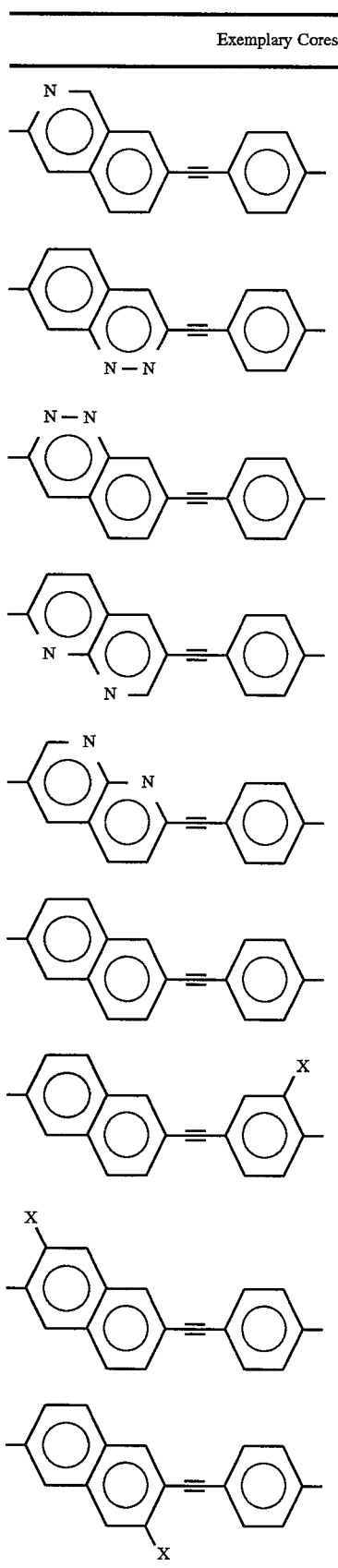
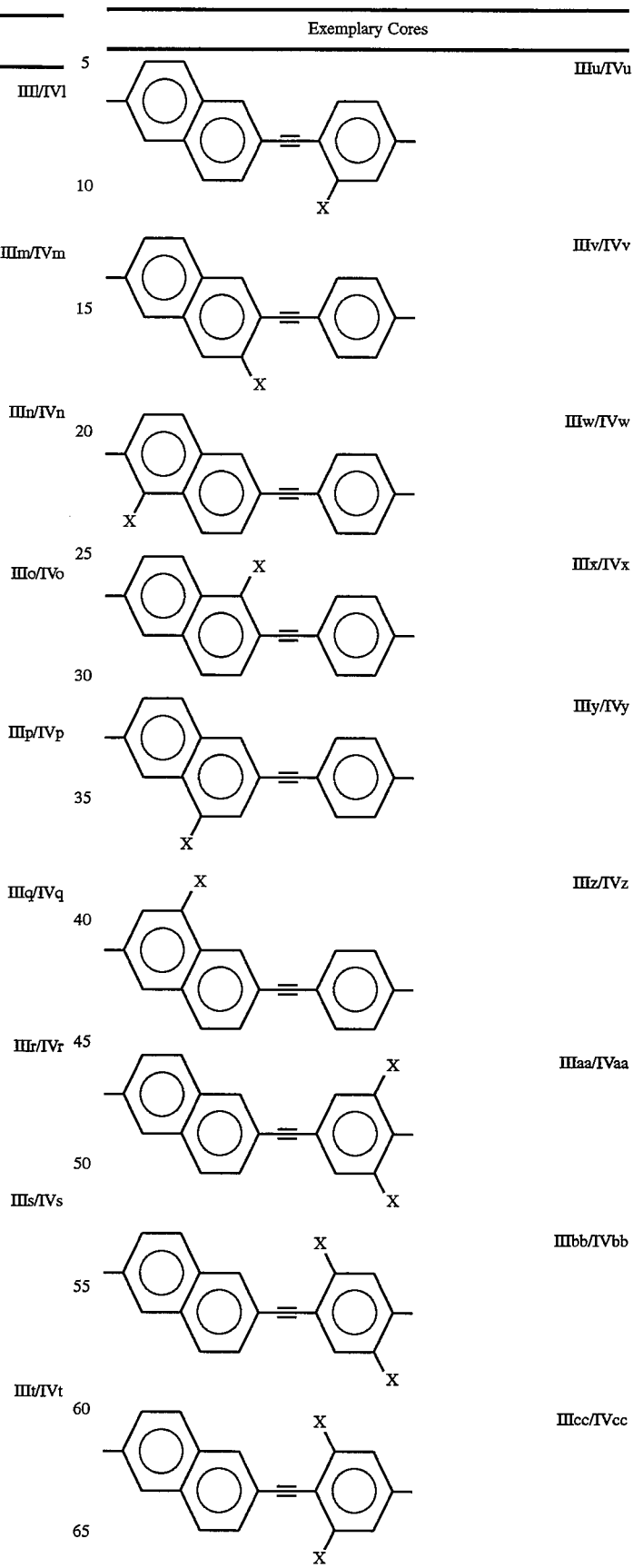

TABLE 1-continued

Exemplary Cores

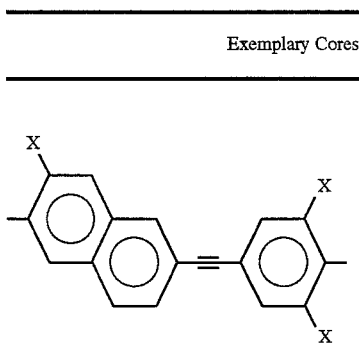

Where X = Cl, or F, and is preferably F

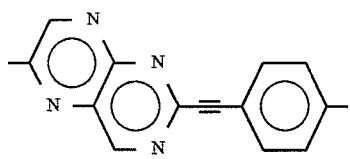    IIIee/IVee

TABLE 1-continued

Exemplary Cores

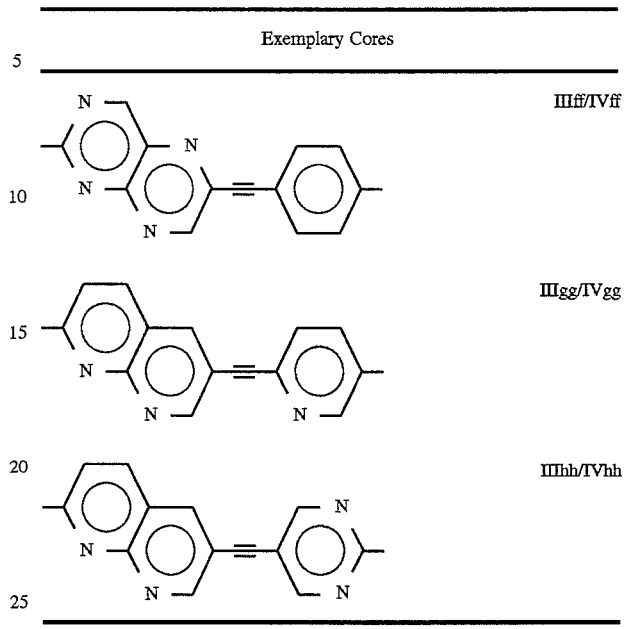

IIIdd/IVdd

IIIff/IVff

IIIgg/IVgg

IIIhh/IVhh

TABLE 2

| Exemplary $R_1-X-$ | |
|---|---|
| $R_1-$ | $R_1-\equiv-$ |
| A. alkyl— | B. alkyl—$\equiv$— |
| $CH_3-Si(CH_3)_2-(CH_2)_n-$ | $CH_3-Si(CH_3)_2-(CH_2)_n-\equiv-$ |
| $CH_3-(CH_2)_n-=-(CH_2)_m-$ | $CH_3-(CH_2)_n-=-(CH_2)_m-\equiv-$ |
| $CH_2=CH_2-(CH_2)_n-$ | $CH_2=CH_2-(CH_2)_n-\equiv-$ |
| $CH_3-(CH_2)_n-\equiv-(CH_2)_m-$ | $CH_3-(CH_2)_n-\equiv-(CH_2)_m-\equiv-$ |
| $CH_3-(CH_2)_n-O-(CH_2)_m-$ | $CH_3-(CH_2)_n-O-(CH_2)_m-\equiv-$ |
| $CH_3-(CH_2)_n-S-(CH_2)_m-$ | $CH_3-(CH_2)_n-S-(CH_2)_m-\equiv-$ |
| $CH_3-(CH_2)_n-CF_2-(CH_2)_m-$ | $CH_3-(CH_2)_n-CF_2-(CH_2)_m-\equiv-$ |
| $CF_3-(CH_2)_n-$ | $CF_3-(CH_2)_n-\equiv-$ |
| $CF_3CF_2-(CH_2)_n-$ | $CF_3CF_2-(CH_2)_n-\equiv-$ |
| $CF_3-(CF_2)_n-(CH_2)_m-$ | $CF_3-(CF_2)_n-(CH_2)_m-$ |
| c-propyl-$(CH_2)_{n-3}-$ | All other $R_1$ from column A |
| c-hexyl-$(CH_2)_{n-6}$ | |
| C. $R_1-=-$ | D. $R_1-O-$ |
| alkyl—$=$— | alkoxy— |
| $CH_3-Si(CH_3)_2-(CH_2)_n-=-$ | $CH_3-Si(CH_3)_2-(CH_2)_m-O-$ |
| $CH_3-(CH_2)_n-=-(CH_2)_m-=-$ | $CH_3-(CH_2)_n-=-(CH_2)_m-O-$ |
| $CH_2=CH_2-(CH_2)_n-=-$ | $CH_2=CH_2-(CH_2)_n-O-$ |
| $CH_3-(CH_2)_n-\equiv-(CH_2)_m-=-$ | $CH_3-(CH_2)_n-\equiv-(CH_2)_m-O-$ |
| $CH_3-(CH_2)_n-O-(CH_2)_m-=-$ | $CH_3-(CH_2)_n-O-(CH_2)_m-O-$ |
| $CH_3-(CH_2)_n-S-(CH_2)_m-=-$ | $CH_3-(CH_2)_n-S-(CH_2)_m-O-$ |
| $CH_3-(CH_2)_n-CF_2-(CH_2)_m-=-$ | $CH_3-(CH_2)_n-CF_2-(CH_2)_m-O-$ |

TABLE 2-continued

Exemplary $R_1-X-$

$CF_3-(CH_2)_n-\equiv-$     $CF_3-(CH_2)_n-O-$
$CF_3CF_2-(CH_2)_n-\equiv-$  $CF_3CF_2-(CH_2)_n-O-$
$CH_3(CH_2)_n-O-CO-\equiv-$  All other $R_1$ from column A
$CH_3(CH_2)_n-S-CO-\equiv-$ All other $R_1$ from column A

E. $R_1-S-$ $CH_3-Si(CH_3)_2-(CH_2)_n-S-$
$CH_3-(CH_2)_n-\equiv-(CH_2)_m-S-$ $CH_2=CH_2-(CH_2)_n-S-$
$CH_3-(CH_2)_n-\equiv\equiv-(CH_2)_m-S-$ $CH_3-(CH_2)_n-O-(CH_2)_m-S-$
$CH_3-(CH_2)_n-S-(CH_2)_m-S-$
$CH_3-(CH_2)_n-CF_2-(CH_2)_m-S-$
$CF_3-(CH_2)_n-S-$
$CF_3CF_2-(CH_2)_n-S-$
All other $R_1$ from column A F. $R_1-Z-\langle\text{cyclohexane}\rangle-(CH_2M)_a-$ G. $R_1-Z-\langle\text{cyclohexene}\rangle-(CH_2M)_a-$ H. $R_1-Z-\langle\text{dioxane}\rangle-(CH_2M)_a-$ I. $R_1-Z-\langle\text{cyclohexane with CN}\rangle-(CH_2M)_a-$ Where n and m are integers; n + m less than or equal to about 20; Z is a single bond, oxygen or sulfur; M is $-CH_2-$, a single bond or oxygen and a is 0 or 1.

TABLE 3

Exemplary $R_2$ of $YR_2$

A. alkyl-
$CH_3-Si(CH_3)_2-(CH_2)_n-$
$CH_3-(CH_2)_n-\equiv-(CH_2)_m-$
$CH_2=CH_2-(CH_2)_n-$
$CH_3-(CH_2)_n-\equiv\equiv-(CH_2)_m-$
$CH_3-(CH_2)_n-O-(CH_2)_m-$
$CH_3-(CH_2)_n-S-(CH_2)_m-$
$CH_3-(CH_2)_n-CF_2-(CH_2)_m-$
$CF_3-(CH_2)_n-$
$CF_3CF_2-(CH_2)_n-$ $CF_3-(CF_2)_n-(CH_2)_m-$
$CH_3-(CF_2)_n-(CH_2)_m-$ n and m are intergers; n + m less than or equal to about 20.

TABLE 4

Exemplary Subgroups of Dopants

1   $R_1X-\langle C\rangle_{A_1,A_2}-\equiv-\langle D\rangle_{B_1,B_2}-CH=CH-C(=O)-X^1R_2$ X = S, O or single bond
X' = S or O TABLE 4-continued
Exemplary Subgroups of Dopants
2 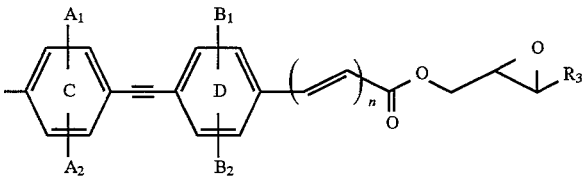  X = S or O or a single bond
n = 0 or 1
3 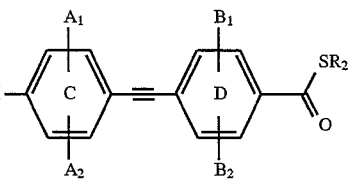  X = S, O or single bond
4 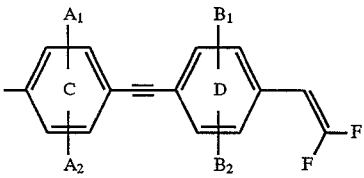  X = S, O or single bond
5 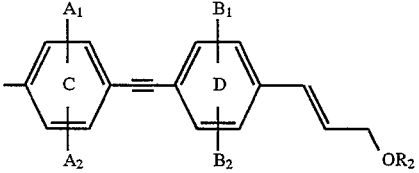  X = S, O or single bond
6 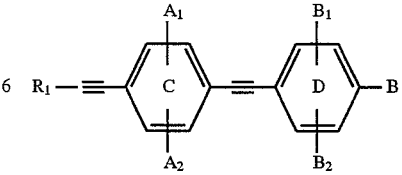  B = F, Cl, OCF$_3$, CF$_3$ or CF$_2$H
7 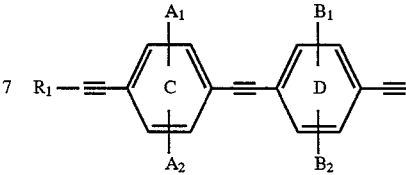
8 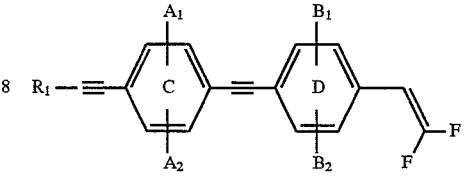
9 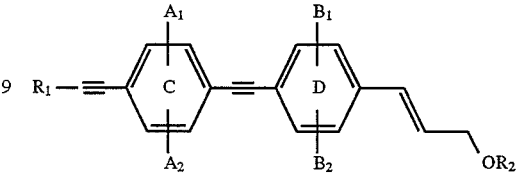

TABLE 4-continued

Exemplary Subgroups of Dopants

| | Structure | Notes |
|---|---|---|
| 10 | $R_1-\equiv-[C(A_1,A_2)]-\equiv-[D(B_1,B_2)]-CH=CH-C(O)-XR_2$ | X = S or O |
| 11 | $R_1X-[C(A_1,A_2)]-\equiv-[D(B_1,B_2)]-(CH=CH)_n-C(O)-O-CH_2-CH(O)-R_3$ | X = S, O or single bond; n = 0 or 1 |
| 12 | $R_1X-[\text{pyridine}]-\equiv-[\text{phenyl}]-\equiv-R_2$ | X = S, O or single bond |
| 13 | $R_1X-[\text{pyridine}]-\equiv-[\text{phenyl}(B_1,B_2)]-\equiv-R_2$ | X = S, O or single bond |
| 14 | $R_1X-[\text{pyrimidine}]-\equiv-[\text{phenyl}]-\equiv-R_2$ | X = S, O or single bond |
| 15 | $R_1X-[\text{pyrimidine}]-\equiv-[\text{phenyl}(B_1,B_2)]-\equiv-R_2$ | X = S, O or single bond |
| 16 | $R_1X-[\text{phenyl}]-\equiv-[\text{phenyl}]-CH=CH-C(O)-OR_2$ | X = S, O or single bond |
| 17 | $R_1X-[\text{phenyl}]-\equiv-[\text{phenyl}]-CH=CH-C(O)-SR_2$ | X = S, O or single bond |
| 18 | $R_1X-[\text{phenyl}]-\equiv-[\text{phenyl}]-CH=CH-C(O)-O-CH_2-CH(O)-R_3$ | X = S, O or single bond |
| 19 | $R_1X-[\text{phenyl}]-\equiv-[\text{phenyl}]-C(O)-SR_2$ | X = S, O or single bond |
| 20 | $R_2-\equiv-[\text{phenyl}]-\equiv-[\text{phenyl}]-B$ | B = F, Cl, $OCF_3$, $CF_3$, $CF_2H$ |

TABLE 4-continued

Exemplary Subgroups of Dopants

| # | Structure | Notes |
|---|---|---|
| 21 | $R_1-\equiv-\text{C}_6\text{H}_4-\equiv-\text{C}_6\text{H}_4-\equiv-R_2$ | |
| 22 | $R_1X-\text{C}_6\text{H}_4-\equiv-\text{C}_6\text{H}_4-\text{CH=CF}_2$ | X = S, O or single bond |
| 23 | $R_1-\equiv-\text{C}_6\text{H}_4-\equiv-\text{C}_6\text{H}_4-\text{CH=CF}_2$ | |
| 24 | $R_1X-\text{C}_6\text{H}_4-\equiv-\text{C}_6\text{H}_4-\text{CH=CH-CH}_2\text{OR}_2$ | X = S, O or single bond |
| 25 | $R_1X-(\text{F-C}_6\text{H}_3)-\equiv-\text{C}_6\text{H}_4-\text{CH=CH-C(O)X'R}_2$ | X = S, O or a single bond; X' = S or O |
| 26 | $R_1-\equiv-\text{C}_6\text{H}_4-\equiv-(\text{F-C}_6\text{H}_3)-B$ | B = F, Cl, OCF$_3$, CF$_3$, or CF$_2$H |
| 27 | $R_1-\equiv-\text{C}_6\text{H}_4-\equiv-\text{C}_6\text{H}_4-\text{CH=CH-C(O)XR}_2$ | X = S or O |
| 28 | $R_1-\equiv-\text{C}_6\text{H}_4-\equiv-\text{C}_6\text{H}_4-\text{CH=CH-CH}_2\text{OR}_2$ | |
| 29 | $R_1-\equiv-\text{C}_6\text{H}_4-\equiv-\text{C}_6\text{H}_4-\text{C(O)O-CH(R}_3)\text{-epoxide}$ | |
| 30 | $R_1-\equiv-\text{pyrimidine}-\equiv-\text{C}_6\text{H}_4-\text{CH=CH-C(O)XR}_2$ | X = S or O |
| 31 | $R_1X-\text{naphthyl}-\equiv-\text{C}_6\text{H}_4-\text{CH=CH-C(O)OR}_2$ | X = S, O or a single bond |

TABLE 4-continued
Exemplary Subgroups of Dopants

32 R₁—≡—[naphthyl]—≡—[phenyl]—CH=CH—C(=O)—OR₂

33 R₁—X—[phenyl(A₁,A₂)]—≡—[phenyl(B₁,B₂)]—CH=CH—C(=S)—XR₂

X = S, O or a single bond
X' = S or O

TABLE 5
Structures of Exemplary Compounds of This Invention

MDW470  C₁₀H₂₁S—[3-F-phenyl]—≡—[phenyl]—CH=CH—C(=O)—SC₈H₁₇

MDW265  (CH₃)₂CH-CH₂-CH₂-CH₂-CH₂-*CH(CH₃)-CH₂-CH₂-O—[phenyl]—≡—[phenyl]—CH=CH—C(=O)—O-CH₂-*CH(-)-CH₂-CH₂-CH₃ (with O substituent)

MDW469  C₁₀H₂₁O—[phenyl]—≡—[phenyl]—CH=CH—C(=O)—S—C₈H₁₇

MDW472  (CH₃)₂CH-CH₂-[1,1-cyclopropyl]-CH₂-CH₂-CH₂-O—[phenyl]—≡—[phenyl]—C(=O)—SC₁₀H₂₁

MDW682  C₄H₉—[phenyl]—≡—[phenyl]—CH=CH—C(=O)—O-CH₂-*CH(CH₃)-CH₂-CH₃

MDW667  C₁₀H₂₁O—[phenyl]—≡—[phenyl]—CH=CH—C(=O)—OCH₃

MDW683  C₁₀H₂₁O—[phenyl]—≡—[phenyl]—CH=CH—C(=O)—O-CH₂-*CH(CH₃)-CH₂-CH₃

MDW697  C₄H₉—≡—[phenyl]—≡—[3,4-difluorophenyl]

TABLE 5-continued
Structures of Exemplary Compounds of This Invention
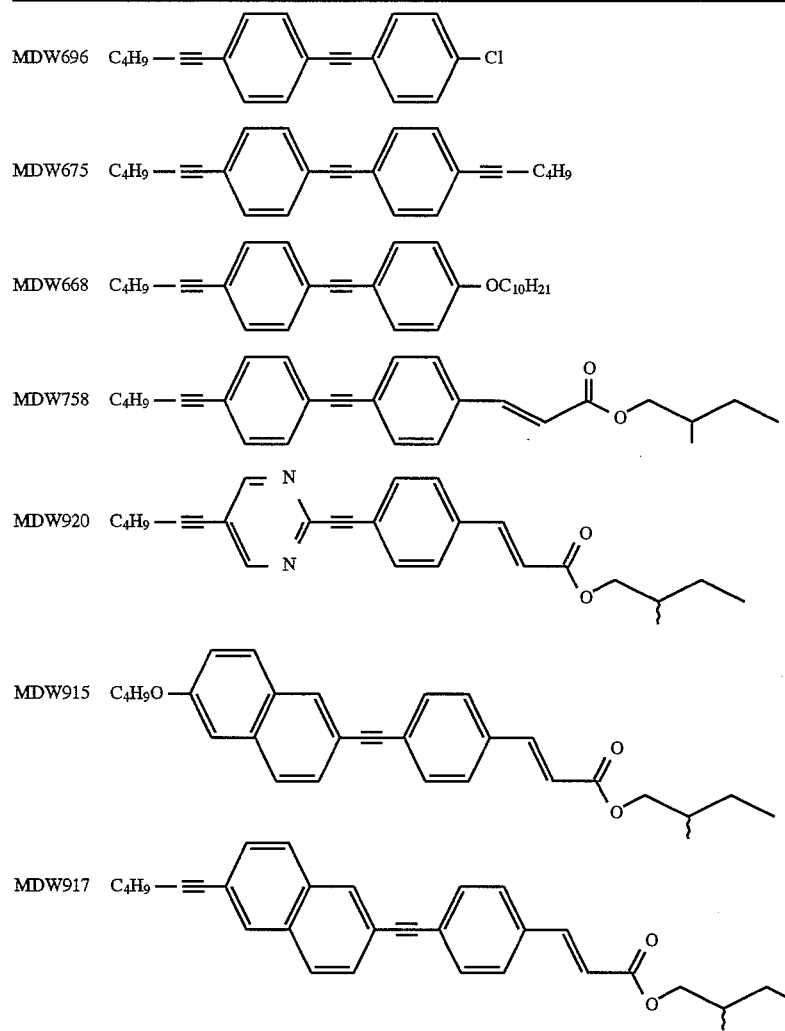
TABLE 6
Phase Diagrams of Exemplary Compounds of This Invention.
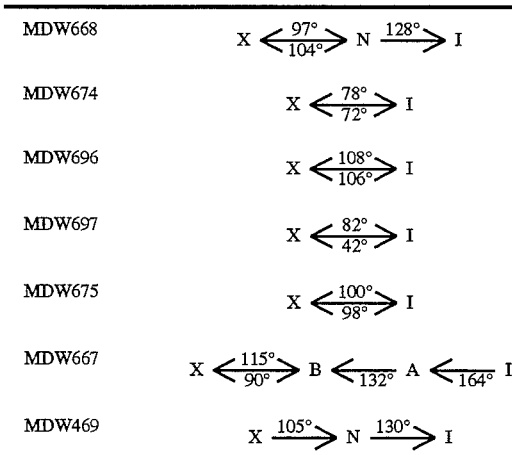
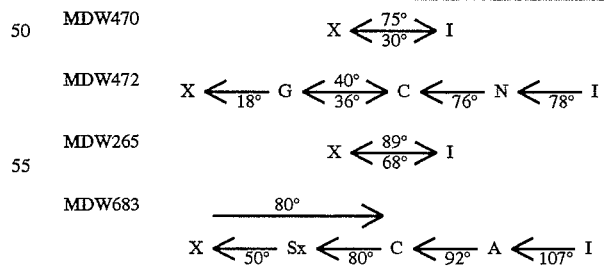
X = Crystalline;
I = Isotropic;
N = nematic;
C = Smectic C
G = Smectic G;
B = Smectic B;
A = Smectic A;
Sx = unknown Smectic

TABLE 7

Qualitative Comparison of Properties of Compounds of the Present Invention

| | Δn[2] | UV stability[3] | IR clarity[4] |
|---|---|---|---|
| Tolane Thiocinnamate | H | M | H |
| Tolane Cinnamate | H | H | M |
| Tolane Thiobenzoate | H | M | M |
| Alkynyl Tolane | H | H | H |
| Dialkynyl Tolane | VH | H | VH |
| Alkynyl Tolane Cinnamate | VH | H | M |
| Dialkyne | H | M–L | M–H |

[1] VH = Very High  H = High  M = Moderate  L = Low
[2] See Example 10
[3] See Example 11
[4] Average percent transmission through a 50 μm cell in an IR spectrometer over 7–12 μm. Low is less than about 25% transmission; Moderate is about 25–40%; High is about 40–50%; and Very High is greater than about 50%.

TABLE 8

The composition of MX6111 is:

| Short name MX6111 | Structure | (% w/w) |
|---|---|---|
| 706 | 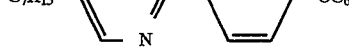 $C_7H_{15}$ — [pyrimidine] — [phenyl] — $OC_6H_{13}$ | 5.6 |
| 707 |  $C_7H_{15}$ — [pyrimidine] — [phenyl] — $OC_7H_{15}$ | 5.6 |
| 708 |  $C_7H_{15}$ — [pyrimidine] — [phenyl] — $OC_8H_{17}$ | 5.6 |
| 709 | 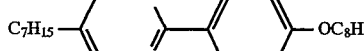 $C_7H_{15}$ — [pyrimidine] — [phenyl] — $OC_9H_{19}$ | 7.2 |
| 906 | 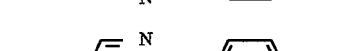 $C_9H_{19}$ — [pyrimidine] — [phenyl] — $OC_6H_{13}$ | 9.6 |
| 907 | 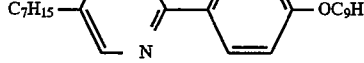 $C_9H_{19}$ — [pyrimidine] — [phenyl] — $OC_7H_{15}$ | 7.2 |
| 908 | 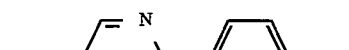 $C_9H_{19}$ — [pyrimidine] — [phenyl] — $OC_8H_{17}$ | 5.6 |
| 909 | 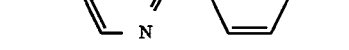 $C_9H_{19}$ — [pyrimidine] — [phenyl] — $OC_9H_{19}$ | 33.6 |
| 900H | 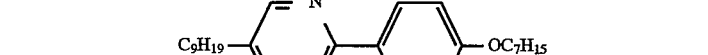 | 20 |

TABLE 8-continued

The composition of MX6111 is:

| Short name MX6111 | Structure | (% w/w) |
|---|---|---|

Phase Diagram of MX6111: X <—-9°—> C <—57°—> A <—70°—> N <—78°—> I

We claim:

1. A liquid crystal composition comprising a liquid crystal host material and a high birefringence liquid crystal dopant having the formula:

$$R_1X\text{—}C\text{—}\equiv\text{—}D\text{—}YR_2$$

wherein

C and D, independently of one another, are aromatic ring systems each of which has one or two 6-member carbon rings wherein one or two carbons of any ring in C or D can be substituted with a nitrogen atom and wherein any ring in C or D can be substituted with one or two halogen atoms;

$YR_2$ where Y is a —COS—, —CS$_2$—, —CH=CH—CO—S—, —CH=CH—CS—S— or —CH=CH—CO—O— group;

X is a single bond, double bond, triple bond, O or S atoms or a cyclohexane or cyclohexene group, Z—Q—W, where Q is a cyclohexane or cyclohexene ring in which one or two of the ring carbons can be replaced with an O atom or in which one or more of the ring carbons can be substituted with a halogen atom or a cyano group, Z is a single bond or an O or S atom and W is a single bond, a —CH$_2$— group, a —CH$_2$—CH$_2$— group, or a —CH$_2$—O— group; and $R_1$ and $R_2$ are, independently of one another, alkyl groups having from about 3 to 20 carbon atoms in which one or more —CH$_2$— groups can be halogenated, two neighboring —CH$_2$— groups can be substituted with an epoxide, or one or more non-neighboring —CH$_2$— groups can be substituted with a double bond, triple bond, an O atom, a S atom, or a silyl group SiR$_A$R$_B$ wherein R$_A$ and R$_B$, independently of one another, are alkyl or alkenyl groups having 1 to about 6 carbon atoms.

2. The liquid crystal composition of claim 1 wherein in said dopant Y is a —CH=CH—CO—S—, —CH=CH—CS—S— or —CH=CH—CO—O— group.

3. A liquid crystal composition of claim 2 wherein in said dopant Y is —CH=CH—CO—O—.

4. A liquid crystal composition of claim 2 wherein in said dopant $R_1$ is an alkyl group having from 3 to about 20 carbon atoms.

5. A liquid crystal composition of claim 4 wherein in said dopant $R_1$ is an alkyl group having from 3 to about 10 carbon atoms.

6. A liquid crystal composition comprising a liquid crystal host material and a high birefringence liquid crystal dopant according to claim 1 that is a nematic liquid crystal composition.

7. A liquid crystal composition comprising a liquid crystal host material and a high birefringence liquid crystal dopant according to claim 1 wherein X is a single bond, double bond, or triple bond or an O or a S atom.

8. A liquid crystal composition comprising a liquid crystal host material and a high birefringence liquid crystal dopant according to claim 1 wherein X is a single bond or an O atom.

9. A liquid crystal composition comprising a liquid crystal host material and a high birefringence liquid crystal dopant according to claim 1 wherein the dopant has the following formula:

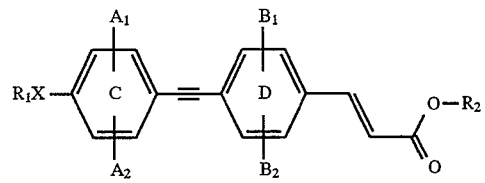

and wherein C and D, independently of one another, are 1,4-phenylenes or 1,4-phenylenes in which one or two of the ring carbon atoms are replaced with nitrogen and wherein $A_1$, $A_2$, $B_1$, or $B_2$ are independently a halogen or a hydrogen and $R_1$ is an alkyl group having 10 to 20 carbon atoms.

10. A liquid crystal composition comprising a liquid crystal host material and a high birefringence liquid crystal dopant according to claim 1 wherein $A_1$, $A_2$, $B_1$, or $B_2$ are independently fluorines or a hydrogen.

11. A liquid crystal composition comprising a liquid crystal host material and a high birefringence liquid crystal dopant according to claim 1 wherein $A_1$, $A_2$, $B_1$, or $B_2$ are all hydrogens.

12. A liquid crystal composition comprising a liquid crystal host material and a high birefringence liquid crystal dopant according to claim 1 wherein C and D are both 1,4-phenylenes.

13. A liquid crystal composition comprising a liquid crystal host material and a high birefringence liquid crystal dopant according to clam 1 wherein C and D, independently of one another are 1,4-phenylenes, 2,5-pyrimidines or 2,5-pyridines.

14. A liquid crystal composition comprising a liquid crystal host material and a high birefringence liquid crystal dopant according to claim 1 wherein X is a single bond or an O atom.

15. A liquid crystal composition comprising a liquid crystal host material and a high birefringence liquid crystal dopant according to claim 1 wherein X is a triple bond.

16. A liquid crystal composition comprising a liquid crystal host material and a high birefringence liquid crystal dopant according to claim 1 wherein Y is —CH=CH—CO—S—.

17. A liquid crystal composition comprising a liquid crystal host material and a high birefringence liquid crystal dopant according to claim 1 wherein Y is —CH=CH—CS—S—.

18. A liquid crystal composition comprising a liquid crystal host material and a high birefringence liquid crystal dopant according to claim 1 wherein Y is —COS— or —CS$_2$.

19. A liquid crystal composition comprising a liquid crystal host material and a high birefringence liquid crystal dopant according to claim 16 wherein the dopant has the formula:

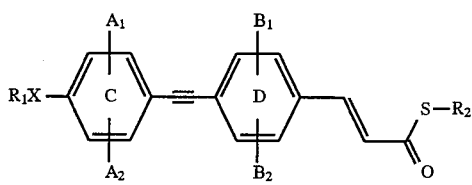

and wherein C and D, independently of one another, are 1,4-phenylenes or 1,4-phenylenes in which one or two of the ring carbon atoms are replaced with nitrogen and wherein $A_1, A_2, B_1$, or $B_2$ are independently a halogen or a hydrogen and $R_1$ is an alkyl group having from about 3 to 20 carbon atoms.

20. A liquid crystal composition comprising a liquid crystal host material and a high birefringence liquid crystal dopant according to claim 17 wherein the dopant has the formula:

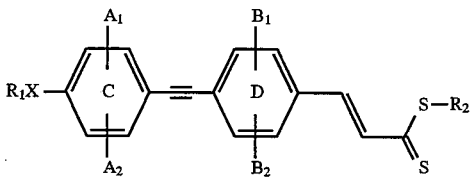

and wherein C and D, independently of one another, are 1,4-phenylenes or 1,4-phenylenes in which one or two of the ring carbon atoms are replaced with nitrogen and wherein $A_1, A_2, B_1$, or $B_2$ are independently a halogen or a hydrogen and R1 is an alkyl group having from about 3 to 20 carbon atoms.

21. A high birefringence liquid crystal dopant having the formula:

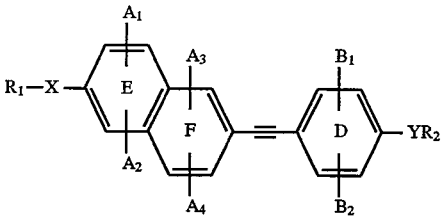

or

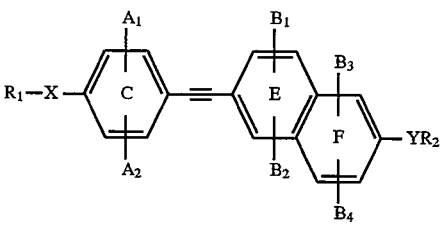

wherein

Y is a —CH=CH—CO—S—, —CH=CH—CS—S—, or —CH=CH—CO—O—;

X is a single bond, double bond, triple bond, O or S atoms or a cyclohexane or cyclohexene group, Z—Q—W, where Q is a cyclohexane or cyclohexene ring in which one or two of the ring carbons can be replaced with an O atom or in which one or more of the ring carbons can be substituted with a halogen atom or a cyano group, Z is a single bond or an O or S atom and W is a single bond, a —$CH_2$— group, a —$CH_2$—$CH_2$— group, or a —$CH_2$—O— group;

$R_1$ and $R_2$ are, independently of one another, alkyl groups having from about 3 to 20 carbon atoms, in which one or more —$CH_2$— groups can be halogenated, two neighboring —$CH_2$— groups can be substituted with an epoxide, or one or more non-neighboring —$CH_2$— groups can be substituted with a double bond, triple bond, an O atom, a S atom, or a silyl group $SiR_AR_B$ wherein $R_A$ and $R_B$, independently of one another, are alkyl or alkenyl groups having 1 to about 6 carbon atoms;

C and D are 1,4-phenylenes or 1,4-phenylenes in which one or two of the ring carbon atoms can be replaced with nitrogen;

E and F together are a naphthalene group or a naphthalene group in which one to two of the carbon atoms of each ring can be replaced with nitrogen; and $A_1, A_2, A_3, A_4, B_1, B_2, B_3$ and $B_4$ are independently a halogen or a hydrogen.

22. The dopant of claim 21 wherein $A_1, A_2, A_3, A_4, B_1, B_2, B_3$ and $B_4$ are, independently of one another, a fluorine or a hydrogen.

23. The dopant of claim 21 wherein $A_1, A_2, A_3, A_4, B_1, B_2, B_3$ and $B_4$ are all hydrogens.

24. The dopant of claim 21 wherein C and D, independently of one another, are 1,4-phenylenes, 2,5-pyrimidines or 2,5-pyridines.

25. The dopant of claim 21 wherein Y is —CH=CH—CO—O—.

26. The dopant of claim 21 wherein X is a single bond or an oxygen atom.

27. A liquid crystal composition comprising a liquid crystal host material and a high birefringence liquid crystal dopant wherein said dopant is the dopant of claim 21.

28. A liquid crystal composition comprising a liquid crystal host material and a high birefringence liquid crystal dopant wherein said dopant is the dopant of claim 25.

* * * * *

UNITED STATES PATENT AND TRADEMARK OFFICE
CERTIFICATE OF CORRECTION

PATENT NO. : 5,626,792

DATED : May 6, 1997

INVENTOR(S) : Wand et al.

It is certified that error appears in the above-identified patent and that said Letters Patent is hereby corrected as shown below:

In Col. 3, line 12, "(E)" should be --(P)--.

In Col. 9, line 40, insert -- $R_2 - \equiv -,$ -- between "$R_2 - \equiv -,$" and "$R_2\text{-O-CO-CH}_2=CH_2$".

In Col. 17, above line 65, insert --or-- between formulas VII-1 and VII-2.

In Col. 20, above line 33, insert --or-- between formulas IX-1 and IX-2.

In Col. 34, in Scheme 10c, "R,X" should be --$R_1X$--.

In Col. 35, in Scheme 10c, "R,X" should be --$R_1X$--.

In claim 9, col. 62, line 27, delete "$A_l$" and replace with --$A_1$--.

Signed and Sealed this

Fourth Day of November, 1997

*Attest:*

BRUCE LEHMAN

*Attesting Officer*    Commissioner of Patents and Trademarks